United States Patent
Gupta et al.

(10) Patent No.: US 11,803,188 B1
(45) Date of Patent: Oct. 31, 2023

(54) SYSTEM FOR DOCKING AN AUTONOMOUS MOBILE DEVICE USING INDUCTIVE SENSORS

(71) Applicant: AMAZON TECHNOLOGIES, INC., Seattle, WA (US)

(72) Inventors: Abhay Gupta, Santa Clara, CA (US); Ravi Yatnalkar, Sunnyvale, CA (US); Bruce Robert Woodley, Palo Alto, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 138 days.

(21) Appl. No.: 17/200,520

(22) Filed: Mar. 12, 2021

(51) Int. Cl.
G05D 1/00 (2006.01)
G05D 1/02 (2020.01)
B62D 15/02 (2006.01)

(52) U.S. Cl.
CPC ....... *G05D 1/0225* (2013.01); *B62D 15/0285* (2013.01); *G05D 1/0088* (2013.01); *G05D 2201/02* (2013.01)

(58) Field of Classification Search
None
See application file for complete search history.

(56) References Cited

U.S. PATENT DOCUMENTS

| | | | | |
|---|---|---|---|---|
| 5,204,814 A * | 4/1993 | Noonan | ............... | G05D 1/0265 701/25 |
| 8,390,251 B2 * | 3/2013 | Cohen | ................... | B25J 19/005 320/109 |
| 2017/0043966 A1 * | 2/2017 | Witelson | ................ | B01D 33/37 |
| 2019/0216014 A1 * | 7/2019 | Hahn | ...................... | B60L 53/62 |
| 2020/0183413 A1 * | 6/2020 | Hook | ................... | G05D 1/0274 |
| 2021/0023706 A1 * | 1/2021 | Sorin | ........................ | B25J 17/02 |
| 2021/0176915 A1 * | 6/2021 | Vines | .................... | G05D 1/0265 |
| 2021/0216070 A1 * | 7/2021 | VanKampen | ......... | A47L 9/2805 |
| 2021/0271262 A1 * | 9/2021 | Alexandrov | ......... | G05D 1/0055 |
| 2022/0187444 A1 * | 6/2022 | Waibel | .................... | G01S 7/003 |

OTHER PUBLICATIONS

Seshan, et al., "Line Followers: Basic to PID", Advanced EV3, Programming Lesson, Jul. 19, 2019, 17 pgs. Retrieved from the Internet: URL: https://ev3lessons.com/en/ProgrammingLessons/advanced/LineFollower.pdf.

* cited by examiner

*Primary Examiner* — James M McPherson
(74) *Attorney, Agent, or Firm* — Lindauer Law, PLLC

(57) ABSTRACT

An autonomous mobile device (AMD) may move around a physical space performing various tasks. Most of the sensors on the AMD may be directed towards the front and sides of the AMD to facilitate autonomous navigation, interactions with users, and so forth. The AMD may return to a dock to recharge batteries, replenish consumables, transfer payload, and so forth. The AMD uses the sensors to approach the vicinity of the dock. Once in the vicinity, the AMD turns around and backs into the dock. This orientation allows the AMD to continue to operate the forward-facing sensors and interact with users while docked. The AMD uses inductive sensors to detect metallic targets located at particular positions in the dock. Output from the inductive sensors provides information about the relative position of the AMD with respect to the dock and is used to steer the AMD into a desired docked position.

20 Claims, 10 Drawing Sheets

SYSTEM FOR DOCKING AN AUTONOMOUS MOBILE DEVICE USING INDUCTIVE SENSORS

BACKGROUND

Every day, a user faces a variety of tasks both personal and work-related that need to be attended to. These may include helping in the care of others such as children or the elderly, taking care of a home, staying in contact with others, and so forth. Devices that assist in these tasks may help the user perform the tasks better or may allow the user to attend to other tasks.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
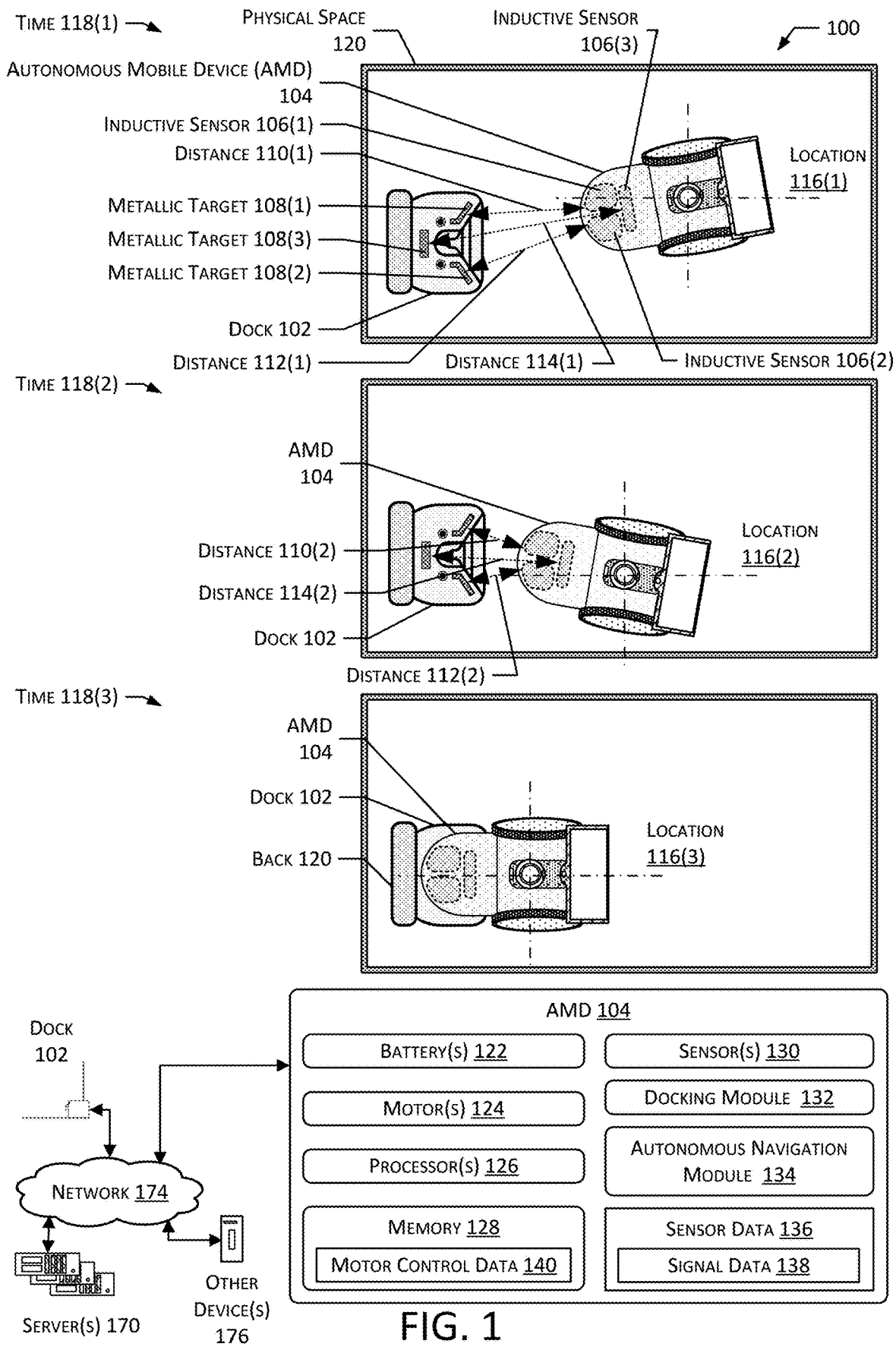
FIG. 1 illustrates a system for docking an autonomous mobile device (AMD) using inductive sensors, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) may be a robot capable of autonomous movement from one location in a physical space to another location without being controlled by a user. The AMD may perform tasks that involve displaying information, accepting input, acquiring sensor data, and so forth. A user may interact with the AMD. The AMD moves in the physical space. For example, the AMD may translate or rotate. The front of the AMD may include a display and a camera that may pan and tilt.

The AMD may use a dock to recharge its onboard batteries, load or unload consumables, transfer payloads, connect to a high-speed network, and so forth. A docking process for the AMD may include approaching a region of the physical space that includes the dock using other techniques, such as simultaneous localization and mapping (SLAM). The AMD may use SLAM to move to a point in front of the dock. When the AMD is near the dock, the AMD may turn around. After turning around, the AMD may be a few centimeters from the dock. Because the AMD backs into the dock, a user is still able to see a display of the AMD, and the AMD has its main sensors viewing an area where a user may be, instead of being directed towards the dock.

However, by backing into the dock, the main sensors are not able to provide information about the whereabouts of the dock during the final phase of navigation into the dock. Blindly backing up into the dock may result in failure due to various factors such as minor variations in trajectory, wheel slippage, and so forth. One possible solution is to use an active dock. The active dock may include one or more sensors used to provide directional guidance to the AMD. Or the active dock may emit a signal that the AMD uses to home in on. However, these solutions have substantial drawbacks. Adding sensors and computing devices to provide an active dock is expensive to produce and consumes electrical power during times when the AMD is not charging. Likewise, adding an emitter to send a signal to the AMD also adds cost to the dock and also wastes electrical power.

Described in this disclosure is a system comprising a dock that is passive during docking and an AMD with integrated inductive sensors that facilitate a final phase of autonomous docking between the AMD and the dock. The dock may be completely passive before and during docking with the AMD. The passive dock reduces production cost, is more reliable as it is much less complex, and substantially reduces idle power consumption during times when the AMD is not recharging.

An aft portion of the AMD includes inductive sensors to detect the presence of a metallic object. In some implementations, a dock may include three metallic targets. A first metallic target may be located along a front, left side of the dock. A second metallic target may be located along a front, right side of the dock. The first and second metallic targets may be located along the perimeter of the dock. The first metallic target may be located along a first front portion of the dock and the second metallic target may be located along a second front portion of the dock. By being located along the perimeter of the dock or along front portions of the dock, the inductive sensors on the AMD detect the metallic targets while approaching the dock. A third metallic target may be located behind the first and second metallic targets. The third metallic target may be used by the AMD to determine when to stop moving backward into the dock.

The docking process for the AMD may continue after the AMD has turned around to back into the dock. Described below are three examples for docking the AMD. A first example describes an AMD that uses three inductive sensors and a dock that includes three metallic targets. A second example describes an AMD that uses two inductive sensors and a dock that includes two metallic targets. A third example describes an AMD that uses two inductive sensors and an inertial measurement unit (IMU) and a dock that includes a protrusion or ridge on a dock ramp.

In the first example, an AMD may use two inductive sensors to align the AMD with the dock and one inductive sensor to determine when the AMD has docked and to stop moving backward. In this example, the AMD may include three inductive sensors near the aft of the AMD. A first and second inductive sensor may be adjacent to each other located near the aft of the AMD and a third inductive sensor may be adjacent to the first and second inductive sensors and may be located between the first and second inductive sensors and the front of the AMD. The dock may include a first metallic target at a front, right portion of the dock, a second metallic target at a front, left portion of the dock, and a third metallic target behind the first and second metallic targets.

Continuing this example, at a first time, the AMD may use a first inductive sensor to determine a first signal strength indicative of a proximity to the first metallic target and use a second inductive sensor to determine a second signal strength indictive of a proximity to the second metallic target. If the first signal strength is equal to the second signal strength, then the AMD is aligned with the dock and the AMD moves straight backward. If the first signal strength is greater than the second signal strength, then the first inductive sensor is closer to the first metallic target than the second inductive sensor is to the second metallic target. To align with the dock, the AMD turns in a direction to reduce the difference between the first signal strength and the second signal strength. The magnitude of the AMD's turn depends on the magnitude of a difference between the first signal strength and the second signal strength.

For example, if the difference between the first signal strength and the second signal strength is small, then the AMD turns a small amount. If the difference between the first signal strength and the second signal strength is large, then the AMD turns a large amount. In this example, the AMD continues using the first and second inductive sensors to determine how much and in which direction to turn as the AMD moves backward. The AMD uses the third inductive sensor to determine when the AMD is docked and to stop moving backward. For example, as the AMD moves backward the signal strength measured by the third inductive sensor increases as the third metallic target gets closer. If the signal strength measured by the third inductive sensor becomes greater than a threshold value, then the AMD stops movement towards the dock.

In the second example, an AMD uses two inductive sensors and a dock that includes two metallic targets. The two inductive sensors may be used to navigate the AMD similarly to the first example where the AMD uses two inductive sensors to align with the dock. In this example, the dock may comprise the first and second metallic targets located similarly to the first and second metallic targets in the first example. In this example, to determine a stopping point, the AMD determines a particular amount of decrease in signal strength after a peak signal strength is detected.

For example, at a first time, as the AMD is backing into the dock, the first inductive sensor may be positioned over the first metallic target and the second inductive sensor may be positioned over the second metallic target. At this first time, the first signal strength measured by the first inductive sensor and the second signal strength measured by the second inductive sensor may be at peak levels. At this first time, the AMD is not yet docked and continues to move backward. As the AMD moves backward, the signal strengths measured by the first and second inductive sensors decrease. When the signal strengths measured by the first and second inductive sensors decrease past a threshold value, then the AMD stops movement towards the dock.

In the third example, the AMD may use two inductive sensors to dock and use an IMU to determine when the AMD has docked and to stop moving backward. The two inductive sensors may be used to navigate the AMD similarly to the above two examples. In this example, the dock may comprise a ramp that has a protrusion or ridge. The protrusion is in a location such that after a wheel of the AMD has moved past the protrusion, the AMD is docked. As the AMD moves backward at a steady velocity, at least one wheel of the AMD makes contact with the protrusion and causes to AMD to slightly jolt upward. The upward jolt causes an increase in acceleration of the AMD, and the increase in acceleration is measured by the IMU. If the increase in acceleration is greater than a threshold value, then the AMD stops movement towards the dock.

By using the systems and techniques described in this disclosure, the AMD is able to reliably navigate to engage with a dock. Inductive sensors are inexpensive, as are metallic targets in the dock. The inductive sensors are also insensitive to environmental contamination, such as dust and dirt, allowing for robust operation. Because the dock is passive, it does not consume electrical power while waiting for the AMD to dock.

Determining motor control instructions for docking is computationally efficient because AMD turns are based on minimal calculations of inductive sensor signal strength. Being docked allows the AMD to recharge batteries, replenish consumables, transfer payload, connect to a high-speed computer network, and so forth. Backing into the dock allows the main sensors and the display of the AMD to remain accessible and available for use while the AMD is docked.

Illustrative System

FIG. 1 illustrates a system 100 for docking an AMD using inductive sensors, according to some implementations.

The AMD 104 may include three inductive sensors, 106(1)—(3). An inductive sensor 106 may use the principle of electromagnetic induction to detect presence of metallic objects. An inductive sensor 106 detects changes in electrical current when a magnetic field generated by the inductive sensor changes, where the magnetic field changes in response to proximity of a metallic object. An inductive sensor 106 measures a strong signal if a metallic object is near and measures a weak signal if a metallic object is farther away. As a result, signal strength is representative of relative proximity. A range of different signal strengths may be associated with a range of different proximities between an inductive sensor and a metallic object. An inductive sensor 106 comprises a coil through which electrical current flows. The coil may be formed according to different shapes, including circular, oval, oblong, rectangular, triangular, among other shapes that allow for the coil to generate a magnetic field when electrical current flows through the coil. In some examples, inductive sensors 106(1)—(3) may impose a low-frequency signal and determine a signal strength based on a magnitude of change to the low-frequency signal.

The example shown in FIG. 1 begins after the AMD 104 has determined to recharge internal batteries at the dock 102. After determining to recharge, the AMD 104 may use various sensors and navigation maps to navigate moving forward to a location that is near the dock 102. The location may be far enough from the dock 102 to allow the AMD 104 to turn around. After turning around, the AMD 104 may back into the dock 102. Time 118(1) is a time after the AMD 104 has turned around.

In this example, the dock 102 comprises multiple metallic targets 108(1)—(3). The metallic targets 108(1)—(3) may be made from ferrous metals such as iron, steel, or from nonferrous metals such as aluminum or copper. The metallic targets 108(1)—(3) may be affixed to a surface of the dock 102. In some examples, the metallic targets 108(1)—(3) may be included beneath a surface of the dock 102. The metallic targets 108(1)—(3) may be formed according to different shapes, including one or more of: circular, oval, oblong, rectangular, triangular, among other shapes that allow for an amount of metal that is detectable by the inductive sensors 106(1)—(3). After turning around to begin backing into the dock, inductive sensor 106(3) is closer to metallic target 108(1) than to metallic targets 108(2, 3), and inductive sensor 106(2) is closer to metallic target 108(2) than to metallic targets 108(1, 3).

At time 118(1), the AMD 104 is depicted in a physical space 120 at location 116(1). In this example, at time 118(1), a front portion of the AMD 104 is turned away from the dock 102. At time 118(1), the AMD 104 may be at location 116(1). At time 118(1), the first inductive sensor 106(1) is at a first distance 110(1) from the first metallic target 108(1). At time 118(1), the second inductive sensor 106(2) is at a second distance 112(1) from the second metallic target 108(2). At time 118(1), the third inductive sensor 106(3) is at a third distance 114(1) from the third metallic target 108(3). In this example, at time 118(1), the first distance 110(1) is less than the second distance 112(1), and the second distance 112(1) is less than the third distance 114(1).

At time 118(1), a docking module 132 uses the first inductive sensor 106(1) to determine a first signal strength based on the first distance 110(1) between the first inductive sensor 106(1) and the first metallic target 108(1). At time 118(1), the docking module 132 uses the second inductive sensor 106(2) to determine a second signal strength based on the second distance 112(1) between the second inductive sensor 106(2) and the second metallic target 108(2). At time 118(1), the docking module 132 uses the third inductive sensor 106(3) to determine a third signal strength based on the third distance 114(1) between the third inductive sensor 106(3) and the third metallic target 108(3).

The AMD 104 may be rotated or turned by a combination of increasing or decreasing a velocity at which one or more wheels rotate. For example, if a left wheel and a right wheel of the AMD 104 are rotating at a same velocity, then the AMD 104 may move straight ahead or straight backward. If the AMD 104 is moving backward and a left wheel is rotating more slowly than a right wheel, then the AMD 104 may turn or rotate to the right, relative to the front of the AMD 104, and so forth.

The docking module 132 may use signal strength to determine a direction in which to turn the AMD 104. For example, as an inductive sensor gets closer to a metallic target, the signal strength measured by the inductive sensor increases. If the first signal strength is equal to the second signal strength, then the AMD 104 may be moved straight backward because both the first inductive sensor 106(1) and the second inductive sensor 106(2) are about a same distance from the dock 102. More specifically, a first distance 110(1) between the first inductive sensor 106(1) and the first metallic target 108(1) is equal or nearly equal to a second distance 112(1) between the second inductive sensor 106(2) and the second metallic target 108(2).

The docking module 132 may use a proportional controller to determine the AMD 104 chassis rotation speed as a function of the strength of inductive sensor measurements. The chassis rotation speed may be determining individual rotation speeds of the left wheel and the right wheel. For example, the left wheel rotation speed may be equal to a docking velocity plus the value of multiplying a first value and a second value, where the first value is a gain value, and the second value is a difference between the first signal strength and the second signal strength. The left wheel rotation speed may be equal to a docking velocity plus the value of multiplying a first value and a second value, where the first value is a gain value, and the second value is a difference between the first signal strength and the second signal strength. The gain value may be determined experimentally and may be based on magnitude of a normalized differential between measurements from the first inductive sensor 106(1) and the second inductive sensor 106(2). The docking speed may also be determined experimentally and may be based on a combination of one or more of: frequency of inductive sensor readings, a turning radius of the AMD 104, or an average distance from the AMD 104 to the dock 102 when the AMD 104 begins to move backward to dock 102.

Using a proportional controller, the docking module 132 may use a magnitude of the difference between the first signal strength and the second signal strength to determine how much to turn the AMD 104. For example, a turn may be measured by an angular measurement, such as a number of degrees or a number of radians. To determine how much to turn the AMD 104, the docking module 132 determines a magnitude of the turn, or a number of degrees, based on the magnitude of the difference between the first and second signal strengths. If the difference between the first and second signal strengths is small, then the AMD 104 is nearly aligned with the dock 102, and the magnitude of the turn is small. Similarly, if the difference between the first and second signal strengths is large, then the AMD 104 is farther from being aligned with the dock 102, and the magnitude of the turn is larger. In this way, the docking module 132 may determine a magnitude of a turn that is proportional to the magnitude of the difference between signal strength measurements. The mathematical sign of the difference may indicate direction, while the magnitude of the difference indicates how far to turn.

In one implementation, the AMD 104 may comprise a plurality of wheels. The wheels may include a first wheel on a first side and a second wheel on a second side. If the first wheel and the second wheel rotate at a same velocity, then the AMD 104 moves straight backward. If the first wheel rotates faster than the second wheel, then the AMD 104 turns in a first direction. If the second wheel rotates faster than the first wheel, then the AMD 104 turns in a second direction. At a first time, the velocity of rotation of the first wheel $V_1$, may be represented by, $V_1=V_B+(K \times d(t_1))$, where $d(t_1)=S_1-S_2$ at time=1. $V_B$ may be indicative of a first velocity. K may be indicative of a gain value. $S_1$ may be indicative of the first signal strength. $S_2$ may be indicative of the second signal strength. $V_1$, the first velocity of the rotation of the first wheel may be associated with a first backup velocity of the AMD 104. The first velocity of the rotation of the first wheel may depend on a wheel radius and on the first backup velocity of the AMD 104. The gain value, K, as described above, may be determined experimentally. Similarly, at the first time, the velocity of rotation of the second wheel, $V_2$, may be represented by, $V_2=V_B-(K \times d(t_1))$.

At the first time, if the first signal strength, $S_1$, is greater than the second signal strength, $S_2$, then $d(t_1)$ is positive, and $V_1=V_B+(K^*d(t_1))$, and $V_2=V_B-(K^*d(t_1))$. Therefore, using inductive sensor 106 measurements at the first time, $V_1$ is greater than $V_2$, and the velocity of rotation of the first wheel is greater than the velocity of rotation of the second wheel, resulting in the AMD 104 turning in the first direction. Similarly, using inductive sensor 106 measurements at a second time, if the first signal strength, $S_1$, is less than the second signal strength, $S_2$, then the velocity of rotation of the first wheel is less than the velocity of rotation of the second wheel, resulting in the AMD 104 turning in the second direction. Similarly, using inductive sensor 106 measurements at a third time, if the signal strength, $S_1$, is equal to the second signal strength, $S_2$, then the velocity of rotation of the first wheel is equal to the velocity of rotation of the second wheel, resulting in the AMD 104 moving straight backward.

In some embodiments, the proportional controller may determine turns without using a gain value. For example, at a first time, the velocity of rotation of the first wheel $V_1$, may be represented by, $V_1=V_B+d(t_1)$, where $d(t_1)=S_1— S_2$ at time=1. $V_B$ may be indicative of a first velocity. $S_1$ may be indicative of the first signal strength. $S_2$ may be indicative of the second signal strength. $V_1$, the first velocity of the rotation of first wheel may be associated with a second backup velocity of the AMD 104. The first velocity of the rotation of the first wheel may depend on a wheel radius and on the second backup velocity of the AMD 104. Similarly, at the first time, the velocity of rotation of the second wheel, $V_2$, may be represented by, $V_2=V_B-d(t_1)$.

At the first time, if the first signal strength, $S_1$, is greater than the second signal strength, $S_2$, then $d(t_1)$ is positive, and $V_1=V_B+d(t_1)$, and $V_2=V_B-d(t_1)$. Therefore, using inductive sensor 106 measurements at the first time, $V_1$ is greater than $V_2$, and the velocity of rotation of the first wheel is greater than the velocity of rotation of the second wheel, resulting in the AMD 104 turning in the first direction. Similarly, using inductive sensor 106 measurements at a second time, if the first signal strength, $S_1$, is less than the second signal strength, $S_2$, then the velocity of rotation of the first wheel is less than the velocity of rotation of the second wheel, resulting in the AMD 104 turning in the second direction. Similarly, using inductive sensor measurements at a third time, if the signal strength, $S_1$, is equal to the second signal strength, $S_2$, then the velocity of rotation of the first wheel is equal to the velocity of rotation of the second wheel, resulting in the AMD 104 moving straight backward.

In some embodiments, the proportional controller may determine turns without determining a turn magnitude. For example, at a first time, the velocity of rotation of the first wheel $V_1$, may be represented by, $V_1=V_B+X$. At time=1, x=0 if $|S_1-S_2|<T$, x=C if $|S_1-S_2|>=T$ and $S_1>S_2$, and x=-C if $|S_1-S_2|>=T$ and $S_1<=S_2$, where |y| indicates an absolute value of y, where C is a constant value, and where T is a threshold value. $V_B$ may be indicative of a first velocity. $S_1$ may be indicative of the first signal strength. $S_2$ may be indicative of the second signal strength. $V_1$, the first velocity of the rotation of first wheel may be associated with a third backup velocity of the AMD 104. The first velocity of the rotation of the first wheel may depend on a wheel radius and on the second backup velocity of the AMD 104. Similarly, at the first time, the velocity of rotation of the second wheel, $V_2$, may be represented by, $V_2=V_B-x$, where x is determined as specified for $V_1$ above.

At the first time, if the first signal strength, $S_1$, is greater than the second signal strength, $S_2$, by more than the threshold value, T, and $S_1>S_2$, then x=C, and $V_1=V_B+C$, and $V_2=V_B-C$. Therefore, using inductive sensor 106 measurements at the first time, $V_1$ is greater than $V_2$, and the velocity of rotation of the first wheel is greater than the velocity of rotation of the second wheel, resulting in the AMD 104 turning in the first direction. Similarly, using inductive sensor 106 measurements at a second time, if the first signal strength, $S_1$, is less than the second signal strength, $S_2$, by more than the threshold value, T, and $S_1<=S_2$, then the velocity of rotation of the first wheel is less than the velocity of rotation of the second wheel, resulting in the AMD 104 turning in the second direction. Similarly, using inductive sensor measurements at a third time, if the difference between the first signal strength, $S_1$ and the second signal strength, $S_2$, is less than the threshold value, T, then the velocity of rotation of the first wheel is equal to the velocity of rotation of the second wheel, resulting in the AMD 104 moving straight backward.

In some examples, a direction for turning the AMD 104 is determined based on reducing a difference between signal strength measurements of the first inductive sensor 106(1) and the second inductive sensor 106(2). For example, at time 118(1), if the first signal strength measured by the first inductive sensor 106(1) is greater than the second signal strength measured by the second inductive sensor 106(2), then the AMD 104 is turned to the right by a magnitude in proportion to the difference between the first signal strength and the second signal strength.

Similarly, at time 118(1), if the first signal strength measured by the first inductive sensor 106(1) is less than the second signal strength measured by the second inductive sensor 106(2), then the AMD 104 is turned to the left by a magnitude in proportion to the difference between the first signal strength and the second signal strength. If the first signal strength and the second signal strength are equal, or nearly equal, then the AMD 104 is moved straight backward.

In this example, at time 118(1), based on the first signal strength being greater than the second signal strength, the AMD 104 is turned to the right and moved backward. As a result, the AMD 104 moves from a first location 116(1) to a second location 116(2) and changes orientation from a first orientation to a second orientation. The orientation of the various portions of the AMD 104 may be indicative of a particular location with respect to a plurality of orthogonal axes and rotation with respect to individual ones of the axes. For example, the orientation may comprise six-dimensional (6D) information indicative of coordinates in three-dimensional space with respect to a designated origin and rotation with respect to each of the three axes.

At time 118(2), the AMD 104 may be at location 116(2). At time 118(2), the first inductive sensor 106(1) is at a fourth distance 110(2) from the first metallic target 108(1). At time 118(2), the second inductive sensor 106(2) is at a fifth distance 112(2) from the second metallic target 108(2). At time 118(2), the third inductive sensor 106(3) is at a sixth distance 114(2) from the third metallic target 108(3). In this example, at time 118(2), the fourth distance 110(2) is greater than the fifth distance 112(2), and the fifth distance 112(2) is less than the sixth distance 114(2).

At time 118(2), the docking module 132 uses the first inductive sensor 106(1) to determine a fourth signal strength based on the fourth distance 110(2) between the first inductive sensor 106(1) and the first metallic target 108(1). At time 118(2), the docking module 132 uses the second inductive sensor 106(2) to determine a fifth signal strength based on the fifth distance 112(2) between the second inductive sensor 106(2) and the second metallic target 108(2). At time 118(2), the docking module 132 uses the third inductive sensor 106(3) to determine a sixth signal strength based on the sixth distance 114(2) between the third inductive sensor 106(3) and the third metallic target 108(3).

In this example, at time 118(2), based on the fourth signal strength being less than the fifth signal strength, the AMD 104 is turned to the left and moved backward. As a result, the AMD 104 moves from the second location 116(2) to a third location 116(3) and changes orientation from the second orientation to a third orientation.

At time 118(3), the AMD 104 may be at location 116(3). At time 118(3), the third inductive sensor 106(3) measures a seventh signal strength from the third metallic target 108(3). In this example, because the seventh signal strength is greater than a threshold value indicative of the AMD 104 being docked, the AMD 104 stops movement towards the dock 102. Being docked, the AMD 104 may recharge one or more internal batteries 122.

In other implementations, instead of using the threshold value as a basis to stop the AMD 104 from moving backward toward the dock 102, a peak intensity determination may be used. For example, as the AMD 104 moves backward toward the dock 102, signal strength values from the inductive sensors 106 may increase as the AMD 104 moves closer to the metallic targets 108. At a point where signal strength values stop increasing in strength and begin to decrease in strength, the AMD 104 may stop movement towards the dock 102. In this example, the beginning of a measured decrease in signal strength after one or more measurements indicating increasing signal strength may be associated with the AMD 104 being docked.

The AMD 104 may include one or more sensors 130 (described below) that have different fields of view (FOV). For example, a first sensor for a pair of cameras may be a time-of-flight depth sensor. The AMD 104 may be configured to dock or connect to a dock 102. The dock 102 may provide external power which the AMD 104 may use to charge a battery 122 of the AMD 104.

The AMD 104 may include battery(s) 122 to provide electrical power for operation of the AMD 104. The battery 122 may be rechargeable, allowing it to store electrical energy obtained from an external source. In other implementations, a wireless power receiver may be used to provide power for operation of the AMD 104, recharge the battery 122, and so forth.

One or more motors 124 or other actuators enable the AMD 104 to move from one location in the physical space 120 to another. For example, a motor 124 may be used to drive a wheel attached to a chassis of the AMD 104, which causes the AMD 104 to move. The AMD 104 may turn, move forward, move backward, and so forth. In another example, actuators may move mechanical legs allowing the AMD 104 to walk.

The AMD 104 may include one or more hardware processors 126 (processors) configured to execute one or more stored instructions. The processors 126 may comprise one or more cores. The processors 126 may include microcontrollers, systems on a chip, field programmable gate arrays, digital signal processors, graphic processing units, general processing units, and so forth.

The AMD 104 includes one or more memories 128. The memory 128 may comprise one or more non-transitory computer-readable storage media (CRSM).

The AMD 104 may include one or more sensors 130. For example, the sensors 130 may include microphones, time-of-flight (TOF) sensors, cameras, LIDAR, inductive sensors 106, and so forth. The sensors 130 may generate sensor data 136 and the inductive sensors 106 may generate signal data 138 indicative of measured signal strength. The sensors 130 are discussed in more detail with regard to FIG. 4.

An autonomous navigation module 134 provides the AMD 104 with the ability to navigate within the physical space 120 without real-time human interaction. The autonomous navigation module 134 may implement, or operate in conjunction with, the mapping module 320 to determine one or more of an occupancy map, a navigation map, or other representations of the physical space 120. The AMD 104 may move through the physical space 120. The motion of the AMD 104 may be described as a trajectory. In some implementations the trajectory may include a series of poses. Each pose may be indicative of a particular location with respect to a plurality of orthogonal axes and rotation with respect to individual ones of the axes. For example, the pose may comprise six-dimensional (6D) information indicative of coordinates in three-dimensional space with respect to a designated origin, and rotation with respect to each of the three axes. With respect to FIG. 1, at each time 118(1)—(3), the AMD 104 may have a different pose based on movement backward and turns made by the AMD 104 using inductive sensors 106 to align with the dock 102. For example, a given pose of the AMD 104 at times 118(1)—(3) may include a given location 116(1)—(3) and a given orientation that describes a direction that the AMD 104 is turned toward. The autonomous navigation module 134 is discussed in more detail with regard to FIG. 3.

The AMD 104 may use the network interfaces 354 to connect to a network 174. For example, the network 174 may comprise a wireless local area network, that in turn is connected to a wide area network such as the Internet.

The dock 102 may also be connected to the network 174. For example, the dock 102 may be configured to connect to the wireless local area network 174 such that the dock 102 and the AMD 104 may communicate.

The AMD 104 may access one or more servers 170 via the network 174. For example, the AMD 104 may utilize a wakeword detection module to determine if the user is addressing a request to the AMD 104. The wakeword detection module 326 may hear a specified word or phrase and transition the AMD 104 or portion thereof to the wake operating mode. Once in the wake operating mode, the AMD 104 may then transfer at least a portion of the audio spoken by the user to one or more servers 170 for further processing. The servers 170 may process the spoken audio and return to the AMD 104 data that may be subsequently used to operate the AMD 104.

The AMD 104 may also communicate with other devices 176. The other devices 176 may include one or more devices that are within the physical space 120 such as a home or associated with operation of one or more devices in the physical space 120. For example, the other devices 176 may include a doorbell camera, a garage door opener, a refrigerator, washing machine, and so forth. In some implementations the other devices 176 may include other AMDs 104, vehicles, and so forth.

Figure 2:
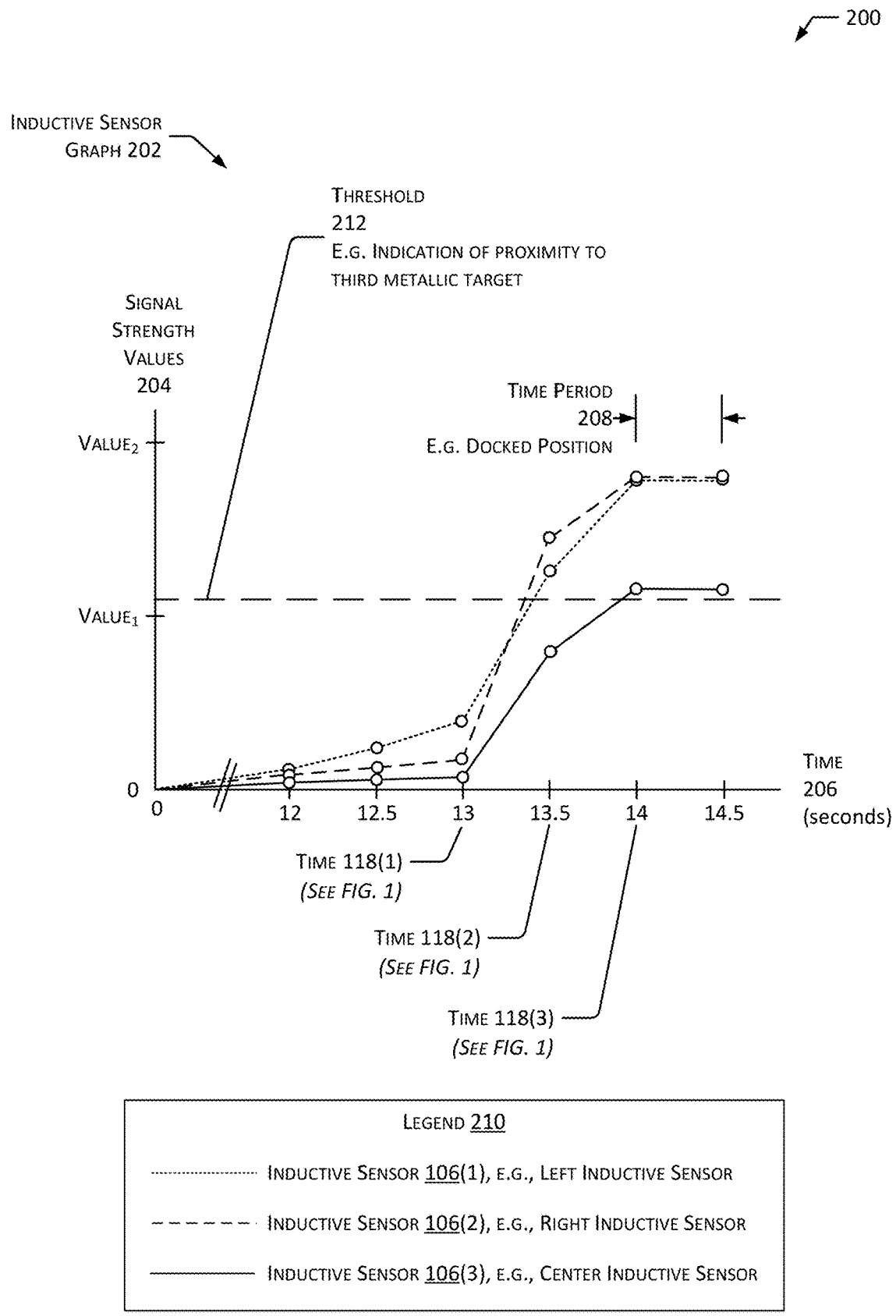
FIG. 2 illustrates a chart of changes in inductive sensor signal strength used to determine motor control data, according to some implementations.

FIG. 2 illustrates a chart of changes in inductive sensor signal strength used to determine motor control data, according to one implementation.

As shown at 200, an inductive sensor graph 202 depicts signal strength values 204, value1 and value2. For example, the signal strength values 204 are depicted over a 14.5 second time period. An inductive sensor 106 may provide output or a measurement value indicative of signal strength, including a value in milliamps or a digitized value indicative of a strength of an inductive sensor measurement. In other examples, depending on an AMD velocity, the time period over which the AMD 104 may dock may be shorter or longer. Inductive sensors 106 may determine a plurality of measurements per time period, where a single signal strength value 204 at a given time may be based on the plurality of measurements. For example, the inductive sensors 106 may make N measurements per second, where each signal strength value depicted in graph 202 may be based on an average of M measurements of the N measurements. In one example, N may be 100 and M may be 10. A legend 210 associates an individual style of line with an individual inductive sensor 106.

The inductive sensor strength measurements in graph 202 are associated with the signal strength measurements described with respect to FIG. 1. The three times 118(1)—(3) are described above with respect to FIG. 1. At time 118(1), a front portion of the AMD 104 is turned away from the dock 102.

At time 118(1), the first inductive sensor 106(1) is at a first distance 110(1) from the first metallic target 108(1). At time 118(1), the second inductive sensor 106(2) is at a second distance 112(1) from the second metallic target 108(2). At time 118(1), the third inductive sensor 106(3) is at a third distance 114(1) from the third metallic target 108(3). At time 118(1), the first distance 110(1) is less than the second distance 112(1), and the second distance 112(1) is less than the third distance 114(1).

In this example, because the first distance 110(1) is less than the second distance 112(1), the first signal strength measured by the first inductive sensor 106(1) is greater than the second signal strength measured by the second inductive sensor 106(2). Because both the first distance 110(1) and the second distance 112(1) are less than the third distance 114(1), the first and second signal strengths are greater than the third signal strength measured by the third inductive sensor 106(3). At time 118(1), based on the first signal strength being greater than the second signal strength, the AMD 104 is turned to the right as the AMD 104 moves backward. Instructions to the motors 124 may be indicated by motor control data 140 and executed by the motor controller. In this example, the AMD 104 may comprise at least a first wheel on a first side and a second wheel on a second side. The motor control data 140 may indicate a rotational velocity of the first wheel as $V_1$ and a rotational velocity of the second wheel as $V_2$. In this example, $V_1$ is greater than $V_2$, and the difference between $V_1$ and $V_2$ results in the AMD 104 turning in a first direction. Similarly, to turn in an opposite direction from the first direction, the motor control data 140 may indicate a rotational velocity of the first wheel as $V_1$ and a rotational velocity of the second wheel as $V_2$, where $V_2$ is greater than $V_1$. To move straight backward, the motor control data 140 may indicate a rotational velocity of the first wheel as $V_1$ and a rotational velocity of the second wheel as $V_2$, where $V_1$ is equal to $V_2$.

At time 118(2), the first inductive sensor 106(1) is at a fourth distance 110(2) from the first metallic target 108(1). At time 118(2), the second inductive sensor 106(2) is at a fifth distance 112(2) from the second metallic target 108(2). At time 118(2), the third inductive sensor 106(3) is at a sixth distance 114(2) from the third metallic target 108(3). At time 118(2), the fourth distance 110(2) is greater than the fifth distance 112(2), and the fifth distance 112(2) is less than the sixth distance 114(2). At time 118(2), based on the fourth signal strength being less than the fifth signal strength, the AMD 104 is turned to the left and as the AMD 104 moves backward.

At time 118(3), the third inductive sensor 106(3) measures a seventh signal strength from the third metallic target 108(3). In this example, because the seventh signal strength is greater than a threshold value 212 indicative of the AMD 104 being docked, the AMD 104 stops movement towards the dock. For example, the seventh signal strength may be indicative of a proximity to the third metallic target 108(3), where the proximity is associated with the AMD 104 being docked. In this example, a time period 208 is indicative of the AMD 104 being docked.

Figure 3:
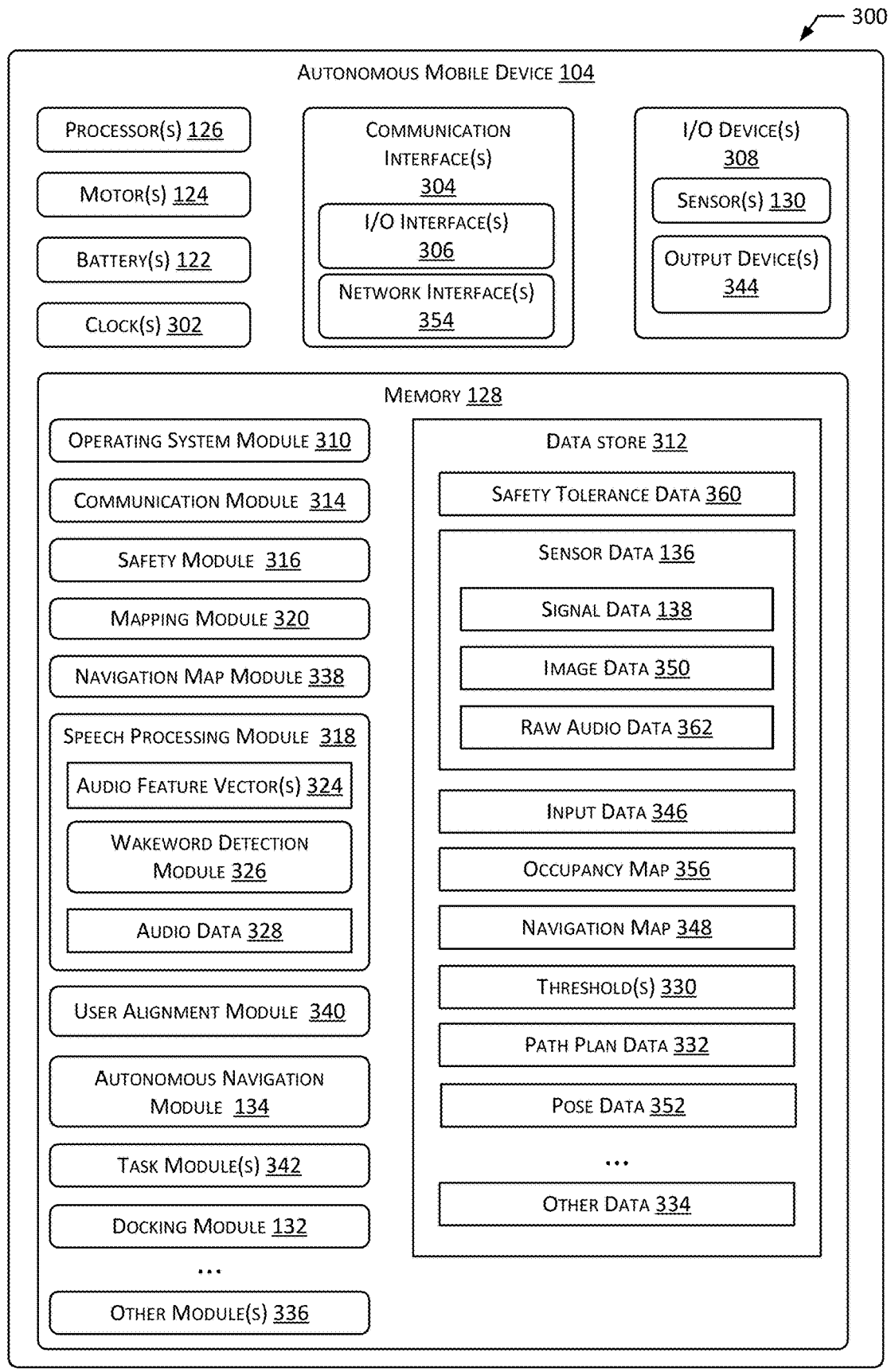
FIG. 3 is a block diagram of the components of the AMD, according to some implementations.

FIG. 3 is a block diagram 300 of the components of the AMD 104, according to some implementations.

The AMD 104 may include one or more batteries 122 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

The AMD 104 may include one or more network interfaces 354. The network interfaces 354 may include devices to connect to personal area networks (PANS), local area networks (LANs), wireless local area networks (WLANS), wide area networks (WANs), and so forth. For example, the network interfaces 354 may include devices compatible with Ethernet, Wi-Fi, Bluetooth, Bluetooth Low Energy, ZigBee, and so forth.

During operation, the AMD 104 may determine input data 346. The input data 346 may include or be based at least in part on sensor data 136 from the sensors 130 onboard the AMD 104. In one implementation, a speech processing module may process raw audio data obtained by a microphone on the AMD 104 and produce input data 346. For example, a user may say "robot, come here" which may produce input data 346 "come here". In another implementation, the input data 346 may comprise information such as a command provided by another computing device, such as a smartphone or tablet computer.

A mapping module 320 determines a representation of the physical space 120 that includes obstacles and their locations in the physical space 120. During operation, the mapping module 320 uses the sensor data 136 from various sensors 130 to determine information such as where the AMD 104 is, how far the AMD 104 has moved, the presence of obstacles, where those obstacles are, and so forth.

The mapping module 320 uses a simultaneous localization and mapping (SLAM) module. Localization is determining where the AMD 104 is in the physical space 120 and may utilize some external reference. For example, cameras may acquire images. These images are processed to determine the presence of features in the images, such as edges of doors, shadows on the wall, texture on the walls, and so forth.

A descriptor is information that describes a particular feature or set of features. Various techniques such as a scale-invariant feature transform (SIFT), speeded up robust features (SURF), a trained convolutional neural network, and so forth may be used to characterize the features and generate the descriptors. For example, the descriptor may comprise data indicative of the feature with respect to 256 different dimensions.

While the AMD 104 is moving, the SLAM module may provide as output a series of poses, each pose describing a location and rotations in the physical space 120. Each pose is based at least in part on the apparent motion of observed features in the images. For example, from image to image at least some of the features that are described by descriptors will be in common. By determining the relative difference in apparent position in the image of the same feature as observed by two different cameras at the same time, the location of the camera with respect to the feature in the physical space 120 may be determined. At successive times, and as the AMD 104 moves and additional images are acquired from locations in the physical space 120, the apparent change in position of the same feature across the additional images may be used to determine subsequent poses. In some implementations, an orientation may comprise information about six dimensions (6D), that of three orthogonal axes and corresponding rotations about those axes.

The SLAM module may also use data from other sensors 130 such as motor encoders, inertial measurement units (IMU) with one or more accelerometers and gyroscopes, and so forth. For example, inertial data indicative of rotations, accelerations along particular axes, and so forth obtained from the IMU may be integrated to provide information about the movement of the AMD 104.

A set of poses generated by the SLAM module over time may describe a given AMD 104 trajectory. For example, trajectory data may comprise a time series of pose data 352 from the SLAM module.

While the AMD 104 is operating, the sensors 130 may be used to acquire sensor data 136 comprising information about the physical space 120. In addition to cameras, the AMD 104 may include depth sensors that may determine depth data about the presence or absence of obstacles in the physical space 120, and so forth. For example, the sensors 130 may comprise a time-of-flight (TOF) depth camera, ultrasound, radar, and so forth. The depth data is indicative of whether an obstacle is detected or not and includes information about the distance between the sensor 130 and the obstacle and relative direction with respect to the sensor 130 of an obstacle, if detected.

The sensor data 136 may be processed to determine occupancy data. The occupancy data is indicative of a particular area in the physical space 120, relative to the pose of the AMD 104 at the time the sensor data 136 was acquired, and whether that area contains an obstacle or is determined to be free from obstacles.

The occupancy map 356 may be manually or automatically determined as part of an exploration process. This exploration may include an explicit exploration in which the AMD 104 moves through the physical space 120 or may be incidental exploration to movement of the AMD 104. For example, explicit exploration may involve the AMD 104 starting with no occupancy map 356 and moving throughout the physical space 120 to determine occupancy data and the corresponding occupancy map 356. In another example incidental exploration may involve the AMD 104 following the user. Continuing the example, during a learning phase the user may take the AMD 104 on a tour of the physical space 120, allowing the mapping module 320 of the AMD 104 to determine occupancy data and the corresponding occupancy map 356. The user may provide input data 346 such as tags or other semantic data that designates a particular obstacle type, such as "furniture" or "fragile". In another example, during subsequent operation, the AMD 104 may generate the occupancy map 356 that is indicative of locations and types of obstacles such as chairs, doors, stairwells, and so forth as it moves unattended through the physical space 120.

Modules described herein, such as the mapping module 320, may provide various processing functions such as de-noising, filtering, and so forth. Processing of sensor data 136, such as image data 350 from a camera, may be performed by a module implementing, at least in part, one or more of the following tools or techniques. In one implementation, processing of image data 350 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 136. In still another implementation, functions such as those in the Machine Vision Toolbox (MVTB) available using MATLAB as developed by MathWorks, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 136 or other data. For example, the ANN may be trained using a supervised learning algorithm such that object identifiers are associated with images of particular objects within training images provided to the ANN. Once trained, the ANN may be provided with the sensor data 136 and produce output indicative of the object identifier.

A navigation map module 338 uses the occupancy map 356 as input to generate a navigation map 348. For example, the navigation map module 338 may produce the navigation map 348 by inflating or enlarging the apparent size of obstacles as indicated by the occupancy map 356.

The AMD 104 autonomous navigation module 134 may generate path plan data 332 that is indicative of a path through the physical space 120 from the current location to a destination location. The AMD 104 may then begin moving along the path.

While moving along the path, the AMD 104 may assess the physical space 120 and update or change the path as appropriate. For example, if an obstacle appears in the path, the mapping module 320 may determine the presence of the obstacle as represented in the occupancy map 356 and navigation map 348. The now updated navigation map 348 may then be used to plan an alternative path to the destination location.

The AMD 104 may utilize one or more task modules 342. The task module 342 comprises instructions that, when executed, provide one or more functions. The task modules 342 may perform functions such as finding a user, following a user, presenting output on output devices 344 of the AMD 104, performing sentry tasks by moving the AMD 104 through the physical space 120 to determine the presence of unauthorized people, and so forth.

The AMD 104 includes one or more output devices 344, such as one or more of a motor 124, light, speaker, display, projector, printer, and so forth. The one or more output devices 344 may be used to provide output during operation of the AMD 104. The output devices 344 are discussed in more detail with regard to FIG. 4.

In other implementations, other types of autonomous mobile devices (AMDs) may use the systems and techniques described herein. For example, the AMD 104 may comprise an autonomous ground vehicle that is moving on a street, an autonomous aerial vehicle in the air, autonomous marine vehicle, and so forth.

One or more clocks 302 may provide information indicative of date, time, ticks, and so forth. For example, the processor 126 may use data from the clock 302 to associate a particular time with an action, sensor data 136, and so forth.

The AMD 104 may include one or more hardware processors 126 (processors) configured to execute one or more stored instructions. The processors 126 may comprise one or more cores. The processors 126 may include microcontrollers, systems on a chip, field programmable gate arrays, digital signal processors, graphic processing units, general processing units, and so forth.

The AMD 104 may include one or more communication interfaces 304 such as input/output (I/O) interfaces 306, network interfaces 354, and so forth. The communication interfaces 304 enable the AMD 104, or components thereof, to communicate with other devices 176 or components. The communication interfaces 304 may include one or more I/O interfaces 308. The I/O interfaces 308 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 308. The I/O devices 308 may include input devices such as one or more of a sensor 130, keyboard, mouse, scanner, and so forth. The I/O devices 308 may also include output devices 344 such as one or more of a motor 124, light, speaker, display, projector, printer, and so forth. In some embodiments, the I/O devices 308 may be physically incorporated with the AMD 104 or may be externally placed.

The network interfaces 354 may be configured to provide communications between the AMD 104 and other devices 176 such as other AMDs 104, the dock 102, routers, access points, and so forth. The network interfaces 354 may include devices configured to couple to personal area networks (PANS), local area networks (LANs), wireless local area networks (WLANS), wide area networks (WANs), and so forth. For example, the network interfaces 354 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104.

As shown in FIG. 3, the AMD 104 includes one or more memories 128. The memory 128 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 128 provides storage of computer-readable instructions, data structures, program modules, and other data for the operation of the AMD 104. A few example functional modules are shown stored in the memory 128, although the same functionality may alternatively be implemented in hardware, firmware, or as a system on a chip (SoC).

The memory 128 may include at least one operating system (OS) module 310. The OS module 310 is configured to manage hardware resource devices such as the I/O interfaces 306, the I/O devices 308, the communication interfaces 304, and provide various services to applications or modules executing on the processors 126. The OS module 310 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS) as promulgated at www.ros.org, and so forth.

Also stored in the memory 128 may be a data store 312 and one or more of the following modules. These modules may be executed as foreground applications, background tasks, daemons, and so forth. The data store 312 may use a flat file, database, linked list, tree, executable code, script, or other data structure to store information. In some implementations, the data store 312 or a portion of the data store 312 may be distributed across one or more other devices 176 including other AMDs 104, servers 170, network attached storage devices, and so forth.

A communication module 314 may be configured to establish communication with other devices 176, such as other AMDs 104, an external server 170, a dock 102, and so forth. The communications may be authenticated, encrypted, and so forth.

Other modules within the memory 128 may include a safety module 316, the mapping module 320, the navigation map module 338, the autonomous navigation module 134, the one or more task modules 342, a speech processing module 318, or other modules 336. The modules may access data stored within the data store 312, including safety tolerance data 360, sensor data 136, other data 334, and so forth.

The safety module 316 may access the safety tolerance data 360 to determine within what tolerances the AMD 104 may operate safely within the physical space 120. For example, the safety module 316 may be configured to stop the AMD 104 from moving when an extensible mast of the AMD 104 is extended. In another example, the safety tolerance data 360 may specify a minimum sound threshold which, when exceeded, stops all movement of the AMD 104. Continuing this example, detection of sound such as a human yell would stop the AMD 104. In another example, the safety module 316 may access safety tolerance data 360 that specifies a minimum distance from an object that the AMD 104 is to maintain. Continuing this example, when a sensor 130 detects an object has approached to less than the minimum distance, all movement of the AMD 104 may be stopped. Movement of the AMD 104 may be stopped by one or more of inhibiting operations of one or more of the motors 124, issuing a command to stop motor operation, disconnecting power from one or more the motors 124, and so forth. The safety module 316 may be implemented as hardware, software, or a combination thereof.

The safety module 316 may control other factors, such as a maximum speed of the AMD 104 based on information obtained by the sensors 130, precision and accuracy of the sensor data 136, and so forth. For example, detection of an object by an optical sensor may include some error, such as when the distance to an object comprises a weighted average between the object and a background. As a result, the maximum speed permitted by the safety module 316 may be based on one or more factors such as the weight of the AMD 104, nature of the floor, distance to the object, and so forth. In the event that the maximum permissible speed differs from the maximum speed permitted by the safety module 316, the lesser speed may be utilized.

One or more inflation parameters may be used during operation. The inflation parameters provide information such as inflation distance, inflation adjustment values, and so forth. In some implementations the inflation parameters may be based at least in part on the sensor FOV, sensor blind spot, physical dimensions of the AMD 104, and so forth.

The speech processing module 318 may be used to process utterances of the user. Microphones may acquire audio in the presence of the AMD 104 and may send raw audio data 362 to an acoustic front end (AFE). The AFE may transform the raw audio data 362 (for example, a single-channel, 16-bit audio stream sampled at 16 kHz), acquired by the microphone, into audio feature vectors 324 that may ultimately be used for processing by various components, such as a wakeword detection module 326, speech recognition engine, or other components. The AFE may reduce noise in the raw audio data 362. The AFE may also perform acoustic echo cancellation (AEC) or other operations to account for output audio data that may be sent to a speaker of the AMD 104 for output. For example, the AMD 104 may be playing music or other audio that is being received from a network 174 in the form of output audio data. To avoid the output audio interfering with the device's ability to detect and process input audio, the AFE or other component may perform echo cancellation to remove the output audio data from the input raw audio data 362, or other operations.

The AFE may divide the raw audio data 362 into frames representing time intervals for which the AFE determines a number of values (i.e., features) representing qualities of the raw audio data 362, along with a set of those values (i.e., a feature vector or audio feature vector 324) representing features/qualities of the raw audio data 362 within each frame. A frame may be a certain period of time, for example a sliding window of 25 ms of audio data 328 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 362, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 324 (or the raw audio data 362) may be input into a wakeword detection module 326 that is configured to detect keywords spoken in the audio. The wakeword detection module 326 may use various techniques to determine whether raw audio data 362 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 326 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 326 may compare audio data 328 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 328 (which may include one or more of the raw audio data 362 or the audio feature vectors 324) to one or more server(s) 170 for speech processing. The audio data 328 corresponding to audio obtained by the microphone may be processed locally on one or more of the processors 126, sent to a server 170 for routing to a recipient device or may be sent to the server 170 for speech processing for interpretation of the included speech (either for purposes of enabling voice-communications and/or for purposes of executing a command in the speech). The audio data 328 may include data corresponding to the wakeword, or the portion of the audio data 328 corresponding to the wakeword may be removed by the AMD 104 before processing by the navigation map module 338, prior to sending to the server 170, and so forth.

The speech processing module 318 may include or access an automated speech recognition (ASR) module. The ASR module may accept as input raw audio data 362, audio feature vectors 324, or other sensor data 136 and so forth and may produce as output the input data 346 comprising a text string or other data representation. The input data 346 comprising the text string or other data representation may be processed by the navigation map module 338 to determine the command to be executed. For example, the utterance of the command "robot, come here" may result in input data 346 comprising the text string "come here". The wakeword "robot" may be omitted from the input data 346.

The autonomous navigation module 134 provides the AMD 104 with the ability to navigate within the physical space 120 without real-time human interaction. The autonomous navigation module 134 may implement, or operate in conjunction with, the mapping module 320 to determine the occupancy map 356, the navigation map 348, or other representation of the physical space 120. In one implementation, the mapping module 320 may use one or more simultaneous localization and mapping ("SLAM") techniques. The SLAM algorithms may utilize one or more of maps, algorithms, beacons, or other techniques to navigate. The autonomous navigation module 134 may use the navigation map 348 to determine a set of possible paths along which the AMD 104 may move. One of these may be selected and used to determine path plan data 332 indicative of a path. For example, a possible path that is the shortest or has the fewest turns may be selected and used to determine the path. The path is then subsequently used to determine a set of commands that drive the motors 124 connected to the wheels. For example, the autonomous navigation module 134 may determine the current location within the physical space 120 and determine path plan data 332 that describes the path to a destination location.

The AMD 104 may use the autonomous navigation module 134 to navigate to a docking area that includes the dock 102. For example, if the AMD 104 determines to recharge one or more batteries 122, then the AMD 104 may use path plan data 332 to navigate to a destination location that is in front of the dock 102. The destination location is far enough in front of the dock 102 that the AMD 104 is able to turn around. As described above, after the AMD 104 turns around in front of the dock 102, the AMD 104 may begin to move backward to dock using the inductive sensors 106(1)—(3) to align the AMD 104 with the dock 102. For example, instructions to the motors 124 may be indicated by motor control data 140 and executed by the motor controller. In this example, the AMD 104 may comprise at least a first wheel on a first side and a second wheel on a second side. The motor control data 140 may indicate a rotational velocity of the first wheel as $V_1$ and a rotational velocity of the second wheel as $V_2$, where $V_1$ is greater than $V_2$, and where the difference between $V_1$ and $V_2$ results in the AMD 104 turning in a first direction. Similarly, to turn in an opposite direction from the first direction, the motor control data 140 may indicate a rotational velocity of the first wheel as $V_1$ and a rotational velocity of the second wheel as $V_2$, where $V_2$ is greater than $V_1$. To move straight backward, the motor control data 140 may indicate a rotational velocity of the first wheel as $V_1$ and a rotational velocity of the second wheel as $V_2$, where $V_1$ is equal to $V_2$.

The autonomous navigation module 134 may utilize various techniques during processing of sensor data 136. For example, image data 350 obtained from cameras on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 126, in response to a command received from one or more communication interfaces 304, as determined from the sensor data 136, and so forth.

For example, an external server 170 may send a command that is received using the network interface 354. This command may direct the AMD 104 to proceed to find a particular user, follow a particular user, and so forth. The AMD 104 may then process this command and use the autonomous navigation module 134 to determine the directions and distances associated with carrying out the command. For example, the command to "come here" may result in the task module 342 sending a command to the autonomous navigation module 134 to move the AMD 104 to a particular location near the user and orient the AMD 104 in a particular direction.

The AMD 104 may connect to the network 174 using one or more of the network interfaces 354. In some implementations, one or more of the modules or other functions described here may execute on the processors 126 of the AMD 104, on the server 170, or a combination thereof. For example, one or more servers 170 may provide various functions, such as ASR, natural language understanding (NLU), providing content such as audio or video to the AMD 104, and so forth.

The other modules 336 may provide other functionality, such as object recognition, speech synthesis, user identification, and so forth. The other modules 336 may comprise a speech synthesis module that is able to convert text data to human speech. For example, the speech synthesis module may be used by the AMD 104 to provide speech that a user is able to understand.

The data store 312 may store the other data 334 as well. For example, localization settings may indicate local preferences such as language, user identifier data may be stored that allows for identification of a particular user, and so forth. The data store 312 may also store values for various thresholds 330, including threshold 212, first threshold 610, second threshold 612, and threshold acceleration 808. Threshold 212 is described with respect to FIG. 2. Thresholds 610, 612 are described with respect to FIG. 6. Threshold 808 is described with respect to FIG. 8.

Figure 4:
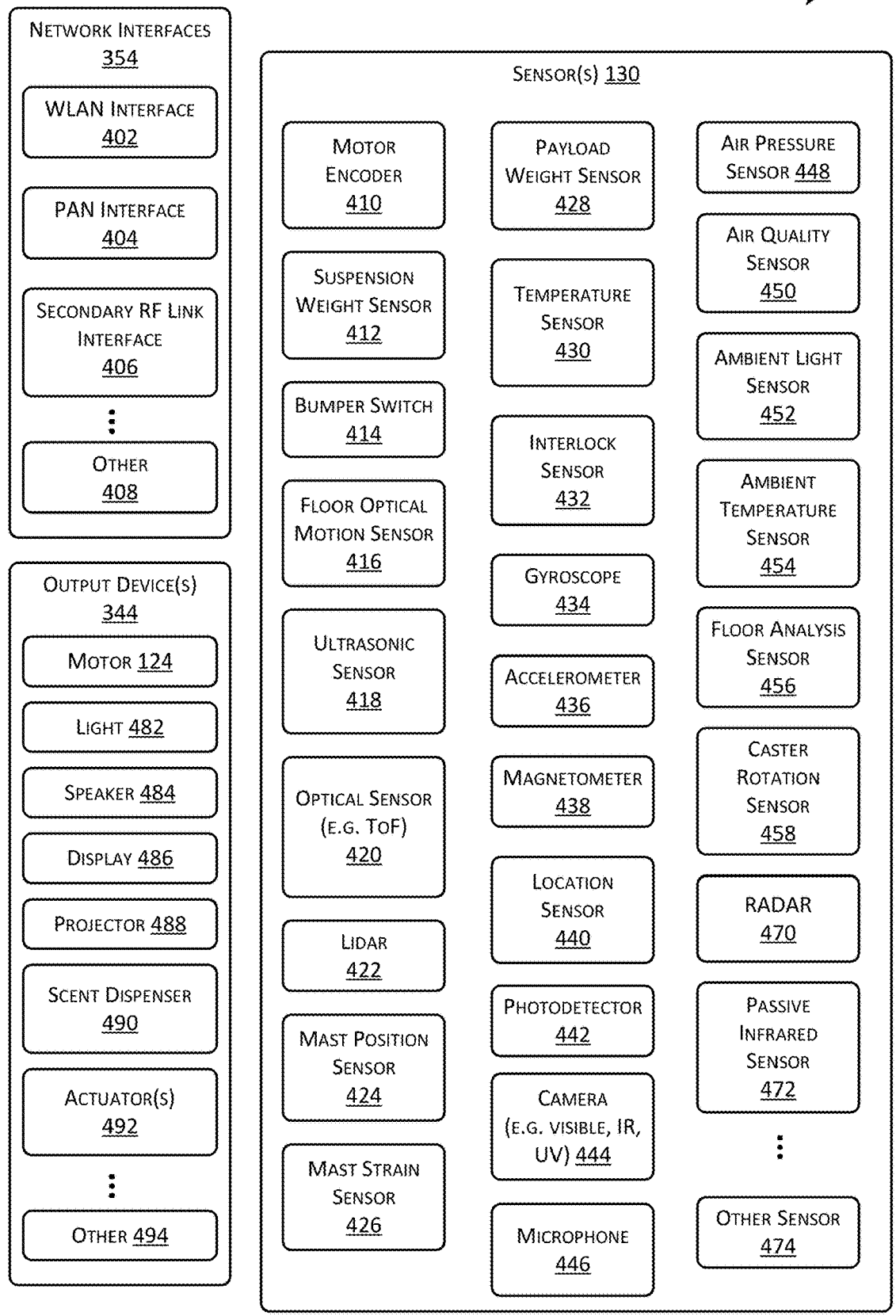
FIG. 4 is a block diagram of some components of the AMD, such as network interfaces, sensors, and output devices, according to some implementations.

FIG. 4 is a block diagram 400 of some components of the AMD 104 such as network interfaces 354, sensors 130, and output devices 344, according to some implementations.

The components illustrated here are provided by way of illustration and not necessarily as a limitation. For example, the AMD 104 may utilize a subset of the particular network interfaces 354, output devices 344, or sensors 130 depicted here, or may utilize components not pictured. One or more of the sensors 130, output devices 344, or a combination thereof may be included on a moveable component that may be panned, tilted, rotated, or any combination thereof with respect to a chassis of the AMD 104.

The network interfaces 354 may include one or more of a WLAN interface 402, PAN interface 404, secondary radio frequency (RF) link interface 406, or other interface 408. The WLAN interface 402 may be compliant with at least a portion of the Wi-Fi specification. For example, the WLAN interface 402 may be compliant with at least a portion of the IEEE 802.11 specification as promulgated by the Institute of Electrical and Electronics Engineers (IEEE). The PAN interface 404 may be compliant with at least a portion of one or more of the Bluetooth, wireless USB, Z-Wave, ZigBee, or other standards. For example, the PAN interface 404 may be compliant with the Bluetooth Low Energy (BLE) specification.

The secondary RF link interface 406 may comprise a radio transmitter and receiver that operate at frequencies different from or using modulation different from the other interfaces. For example, the WLAN interface 402 may utilize frequencies in the 2.4 GHz and 5 GHz Industrial Scientific and Medicine (ISM) bands, while the PAN interface 404 may utilize the 2.4 GHz ISM bands. The secondary RF link interface 406 may comprise a radio transmitter that operates in the 900 MHz ISM band, within a licensed band at another frequency, and so forth. The secondary RF link interface 406 may be utilized to provide backup communication between the AMD 104 and other devices 176 in the event that communication fails using one or more of the WLAN interface 402 or the PAN interface 404. For example, in the event the AMD 104 travels to an area within the physical space 120 that does not have Wi-Fi coverage, the AMD 104 may use the secondary RF link interface 406 to communicate with another device such as a specialized access point, dock 102, or other AMD 104.

The other 408 network interfaces may include other equipment to send or receive data using other wavelengths or phenomena. For example, the other 408 network interface may include an ultrasonic transceiver used to send data as ultrasonic sounds, a visible light system that communicates by modulating a visible light source such as a light-emitting diode, and so forth. In another example, the other 408 network interface may comprise a wireless wide area network (WWAN) interface or a wireless cellular data network interface. Continuing the example, the other 408 network interface may be compliant with at least a portion of the 4G, LTE, 5G, or other standards.

The AMD 104 may include one or more of the following sensors 130. The sensors 130 depicted here are provided by way of illustration and not necessarily as a limitation. It is understood that other sensors 130 may be included or utilized by the AMD 104, while some sensors 130 may be omitted in some configurations.

A motor encoder 410 provides information indicative of the rotation or linear extension of a motor 124. The motor 124 may comprise a rotary motor, or a linear actuator. In some implementations, the motor encoder 410 may comprise a separate assembly such as a photodiode and encoder wheel that is affixed to the motor 124. In other implementations, the motor encoder 410 may comprise circuitry configured to drive the motor 124. For example, the autonomous navigation module 134 may utilize the data from the motor encoder 410 to estimate a distance traveled.

A suspension weight sensor 412 provides information indicative of the weight of the AMD 104 on the suspension system for one or more of the wheels or the caster. For example, the suspension weight sensor 412 may comprise a switch, strain gauge, load cell, photodetector 442, or other sensing element that is used to determine whether weight is applied to a particular wheel, or whether weight has been removed from the wheel. In some implementations, the suspension weight sensor 412 may provide binary data such as a "1" value indicating that there is a weight applied to the wheel, while a "0" value indicates that there is no weight applied to the wheel. In other implementations, the suspension weight sensor 412 may provide an indication such as so many kilograms of force or newtons of force. The suspension weight sensor 412 may be affixed to one or more of the wheels or the caster. In some situations, the safety module 316 may use data from the suspension weight sensor 412 to determine whether or not to inhibit operation of one or more of the motors 124. For example, if the suspension weight sensor 412 indicates no weight on the suspension, the implication is that the AMD 104 is no longer resting on its wheels, and thus operation of the motors 124 may be inhibited. In another example, if the suspension weight sensor 412 indicates weight that exceeds a threshold value, the implication is that something heavy is resting on the AMD 104 and thus operation of the motors 124 may be inhibited. For example, the threshold value may comprise a weight of a load that compresses a suspension system to a minimum height, or results in a mass that exceeds a torque output of the motors 124 to maintain a minimum acceleration.

One or more bumper switches 414 provide an indication of physical contact between a bumper or other member that is in mechanical contact with the bumper switch 414. The safety module 316 utilizes sensor data 136 obtained by the bumper switches 414 to modify the operation of the AMD 104. For example, if the bumper switch 414 associated with a front of the AMD 104 is triggered, the safety module 316 may drive the AMD 104 backwards.

A floor optical motion sensor (FOMS) 416 provides information indicative of motion of the AMD 104 relative to the floor or other surface underneath the AMD 104. In one implementation, the FOMS 416 may comprise a light source such as light-emitting diode (LED), an array of photodiodes, and so forth. In some implementations, the FOMS 416 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 416 may provide other information, such as data indicative of a pattern present on the floor, composition of the floor, color of the floor, and so forth. For example, the FOMS 416 may utilize an optoelectronic sensor that may detect different colors or shades of gray, and this data may be used to generate floor characterization data. The floor characterization data may be used for navigation.

An ultrasonic sensor 418 utilizes sounds in excess of 20 kHz to determine a distance from the sensor 130 to an object. The ultrasonic sensor 418 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 418 may provide information indicative of a presence of an object, distance to the object, and so forth. Two or more ultrasonic sensors 418 may be utilized in conjunction with one another to determine a location within a two-dimensional plane of the object.

In some implementations, the ultrasonic sensor 418 or a portion thereof may be used to provide other functionality. For example, the emitter of the ultrasonic sensor 418 may be used to transmit data and the detector may be used to receive data transmitted that is ultrasonic sound. In another example, the emitter of an ultrasonic sensor 418 may be set to a particular frequency and used to generate a particular waveform such as a sawtooth pattern to provide a signal that is audible to an animal, such as a dog or a cat.

An optical sensor 420 may provide sensor data 136 indicative of one or more of a presence or absence of an object, a distance to the object, or characteristics of the object. The optical sensor 420 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 420 may utilize one or more sensing elements. For example, the optical sensor 420 may comprise a 4×4 array of light sensing elements. Each individual sensing element may be associated with a field of view (FOV) that is directed in a different way. For example, the optical sensor 420 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 130 such as an image sensor or camera 444. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 420 may operate as a depth camera, providing a two-dimensional image of a scene, as well as data that indicates a distance to each pixel.

Data from the optical sensors 420 may be utilized for collision avoidance. For example, the safety module 316 and the autonomous navigation module 134 may utilize the sensor data 136 indicative of the distance to an object in order to prevent a collision with that object.

Multiple optical sensors 420 may be operated such that their FOV overlap at least partially. To minimize or eliminate interference, the optical sensors 420 may selectively control one or more of the timing, modulation, or frequency of the light emitted. For example, a first optical sensor 420 may emit light modulated at 30 kHz while a second optical sensor 420 emits light modulated at 33 kHz.

A lidar 422 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 136 may be generated that is indicative of the presence of objects and the relative positions, shapes, and so forth that are visible to the lidar 422. Data from the lidar 422 may be used by various modules. For example, the autonomous navigation module 134 may utilize point cloud data generated by the lidar 422 for localization of the AMD 104 within the physical space 120.

The AMD 104 may include a mast. A mast position sensor 424 provides information indicative of a position of the mast of the AMD 104. For example, the mast position sensor 424 may comprise limit switches associated with the mast extension mechanism that indicate whether the mast is at an extended or retracted position. In other implementations, the mast position sensor 424 may comprise an optical code on at least a portion of the mast that is then interrogated by an optical emitter and a photodetector 442 to determine the distance to which the mast is extended. In another implementation, the mast position sensor 424 may comprise an encoder wheel that is attached to a mast motor that is used to raise or lower the mast. The mast position sensor 424 may provide data to the safety module 316. For example, if the AMD 104 is preparing to move, data from the mast position sensor 424 may be checked to determine if the mast is retracted, and if not, the mast may be retracted prior to beginning movement.

A mast strain sensor 426 provides information indicative of a strain on the mast with respect to the remainder of the AMD 104. For example, the mast strain sensor 426 may comprise a strain gauge or load cell that measures a side-load applied to the mast or a weight on the mast or downward pressure on the mast. The safety module 316 may utilize sensor data 136 obtained by the mast strain sensor 426. For example, if the strain applied to the mast exceeds a threshold amount, the safety module 316 may direct an audible and visible alarm to be presented by the AMD 104.

The AMD 104 may include a modular payload bay. A payload weight sensor 428 provides information indicative of the weight associated with the modular payload bay. The payload weight sensor 428 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 428 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 428 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 316 may utilize the payload weight sensor 428 to determine if the modular payload bay has been overloaded. If so, an alert or notification may be issued.

One or more device temperature sensors 430 may be utilized by the AMD 104. The device temperature sensors 430 provide temperature data of one or more components within the AMD 104. For example, a device temperature sensor 430 may indicate a temperature of one or more the batteries 122, one or more motors 124, and so forth. In the event the temperature exceeds a threshold value, the component associated with that device temperature sensor 430 may be shut down. For example, the threshold value may be determined based on component specifications, such as a maximum permissible temperature of the batteries 122.

One or more interlock sensors 432 may provide data to the safety module 316 or other circuitry that prevents the AMD 104 from operating in an unsafe condition. For example, the interlock sensors 432 may comprise switches that indicate whether an access panel is open. The interlock sensors 432 may be configured to inhibit operation of the AMD 104 until the interlock switch indicates a safe condition is present.

A gyroscope 434 may provide information indicative of rotation of an object affixed thereto. For example, a gyroscope 434 may generate sensor data 136 that is indicative of a change in orientation of the AMD 104 or a portion thereof.

An accelerometer 436 provides information indicative of a direction and magnitude of an imposed acceleration. Data such as rate of change, determination of changes in direction, speed, and so forth may be determined using the accelerometer 436. The accelerometer 436 may comprise mechanical, optical, micro-electromechanical, or other devices. For example, the gyroscope 434 in the accelerometer 436 may comprise a prepackaged solid-state inertial measurement unit (IMU) that provides multiple axis gyroscopes 434 and accelerometers 436.

A magnetometer 438 may be used to determine an orientation by measuring ambient magnetic fields, such as the terrestrial magnetic field. For example, the magnetometer 438 may comprise a Hall effect transistor that provides output compass data indicative of a magnetic heading.

The AMD 104 may include one or more location sensors 440. The location sensors 440 may comprise an optical, radio, or other navigational system such as a global positioning system (GPS) receiver. For indoor operation, the location sensors 440 may comprise indoor position systems, such as using Wi-Fi Positioning Systems (WPS). The location sensors 440 may provide information indicative of a relative location, such as "living room" or an absolute location such as particular coordinates indicative of latitude and longitude, or displacement with respect to a predefined origin.

A photodetector 442 provides sensor data 136 indicative of impinging light. For example, the photodetector 442 may provide data indicative of a color, intensity, duration, and so forth.

A camera 444 generates sensor data 136 indicative of one or more images. The camera 444 may be configured to detect light in one or more wavelengths including, but not limited to, terahertz, infrared, visible, ultraviolet, and so forth. For example, an infrared camera 444 may be sensitive to wavelengths between approximately 700 nanometers and 1 millimeter. The camera 444 may comprise charge coupled devices (CCD), complementary metal oxide semiconductor (CMOS) devices, microbolometers, and so forth. The AMD 104 may use image data acquired by the camera 444 for object recognition, navigation, collision avoidance, user communication, and so forth. For example, a pair of cameras 444 sensitive to infrared light may be mounted on the front of the AMD 104 to provide binocular stereo vision, with the sensor data 136 comprising images being sent to the autonomous navigation module 134. In another example, the camera 444 may comprise a 10 megapixel or greater camera that is used for videoconferencing or for acquiring pictures for the user.

The camera 444 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 444, particularly those associated with navigation or autonomous operation, may utilize a global shutter. In other implementations, the camera(s) 444 providing images for use by the autonomous navigation module 134 may be acquired using a rolling shutter and subsequently may be processed to mitigate image artifacts.

One or more microphones 446 may be configured to acquire information indicative of sound present in the physical space 120. In some implementations, arrays of microphones 446 may be used. These arrays may implement beamforming techniques to provide for directionality of gain. The AMD 104 may use the one or more microphones 446 to acquire information from acoustic tags, accept voice input from users, determine a direction of an utterance, determine ambient noise levels, for voice communication with another user or system, and so forth.

An air pressure sensor 448 may provide information indicative of an ambient atmospheric pressure or changes in ambient atmospheric pressure. For example, the air pressure sensor 448 may provide information indicative of changes in air pressure due to opening and closing of doors, weather events, and so forth.

An air quality sensor 450 may provide information indicative of one or more attributes of the ambient atmosphere. For example, the air quality sensor 450 may include one or more chemical sensing elements to detect the presence of carbon monoxide, carbon dioxide, ozone, and so forth. In another example, the air quality sensor 450 may comprise one or more elements to detect particulate matter in the air, such as the photoelectric detector, ionization chamber, and so forth. In another example, the air quality sensor 450 may include a hygrometer that provides information indicative of relative humidity.

An ambient light sensor 452 may comprise one or more photodetectors 442 or other light-sensitive elements that are used to determine one or more of the color, intensity, or duration of ambient lighting around the AMD 104.

An ambient temperature sensor 454 provides information indicative of the temperature of the ambient physical space 120 proximate to the AMD 104. In some implementations, an infrared temperature sensor may be utilized to determine the temperature of another object at a distance.

A floor analysis sensor 456 may include one or more components that are used to generate at least a portion of floor characterization data. In one implementation, the floor analysis sensor 456 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 456 may be used by one or more of the safety module 316, the autonomous navigation module 134, the task module 342, and so forth. For example, if the floor analysis sensor 456 determines that the floor is wet, the safety module 316 may decrease the speed of the AMD 104 and generate a notification alerting the user.

The floor analysis sensor 456 may include other components as well. For example, a coefficient of friction sensor may comprise a probe that comes into contact with the surface and determines the coefficient of friction between the probe and the floor.

A caster rotation sensor 458 provides data indicative of one or more of a direction of orientation, angular velocity, linear speed of the caster, and so forth. For example, the caster rotation sensor 458 may comprise an optical encoder and corresponding target that is able to determine that the caster transitioned from an angle of 0° at a first time to 49° at a second time.

The sensors 130 may include a radar 470. The radar 470 may be used to provide information as to a distance, lateral position, and so forth, to an object.

The sensors 130 may include a passive infrared (PIR) sensor 472. The PIR 462 sensor may be used to detect the presence of users, pets, hotspots, and so forth. For example, the PIR sensor 472 may be configured to detect infrared radiation with wavelengths between 8 and 14 micrometers.

The AMD 104 may include other sensors 474 as well. For example, a capacitive proximity sensor may be used to provide proximity data to adjacent objects. Other sensors 474 may include radio frequency identification (RFID) readers, near field communication (NFC) systems, coded aperture cameras, and so forth. For example, NFC tags may be placed at various points within the physical space 120 to provide landmarks for the autonomous navigation module 134. One or more touch sensors may be utilized to determine contact with a user or other objects.

The AMD 104 may include one or more output devices 344. A motor 124 may be used to provide linear or rotary motion. A light 482 may be used to emit photons. A speaker 484 may be used to emit sound. A display 486 may comprise one or more of a liquid crystal display, light emitting diode display, electrophoretic display, cholesteric liquid crystal display, interferometric display, and so forth. The display 486 may be used to present visible information such as graphics, pictures, text, and so forth. In some implementations, the display 486 may comprise a touchscreen that combines a touch sensor and a display 486.

In some implementations, the AMD 104 may be equipped with a projector 488. The projector 488 may be able to project an image on a surface, such as the floor, wall, ceiling, and so forth.

A scent dispenser 490 may be used to emit one or more smells. For example, the scent dispenser 490 may comprise a plurality of different scented liquids that may be evaporated or vaporized in a controlled fashion to release predetermined amounts of each.

One or more moveable component actuators 492 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 492 to produce movement of the moveable component.

In other implementations, other 494 output devices may be utilized. For example, the AMD 104 may include a haptic output device that provides output that produces particular touch sensations to the user. Continuing the example, a motor 124 with an eccentric weight may be used to create a buzz or vibration to allow the AMD 104 to simulate the purr of a cat.

Figure 5:
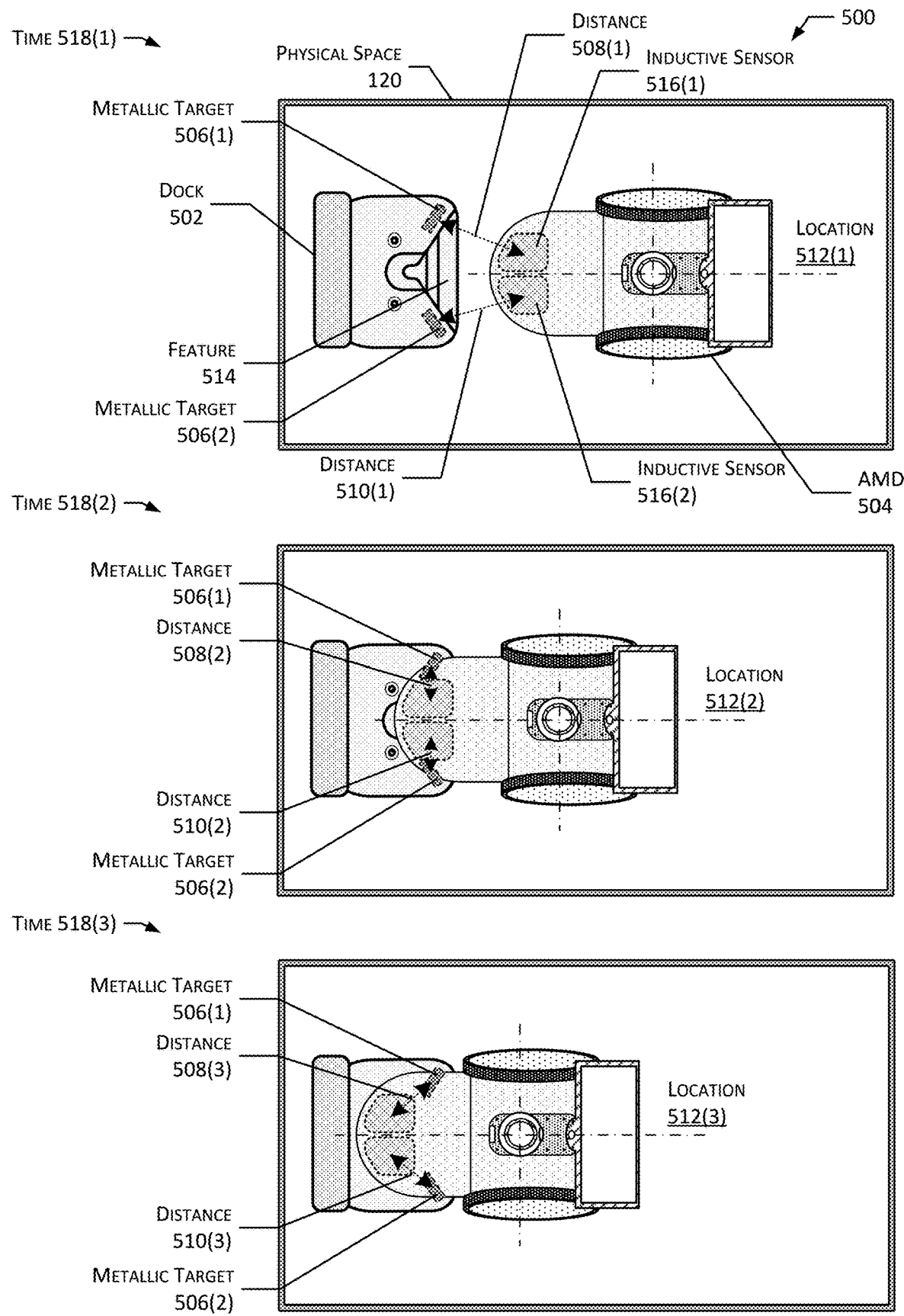
FIG. 5 illustrates a system for docking an AMD using inductive sensors, according to some implementations.

FIG. 5 illustrates a system 500 for docking an AMD using inductive sensors, according to some implementations.

The AMD 504 may include two inductive sensors, inductive sensors 516(1, 2). In this example, the AMD 504 determines when to stop moving backward based on determining that signal strength has peaked and then determining an amount of loss of signal strength as the inductive sensors 516 move over and past the metallic targets on a dock 502.

Aside from having two inductive sensors instead of three, the AMD 504 may be implemented similarly to the AMD 104 described above. The docking process for the AMD 504 using two inductive sensors is described below. In this example, the dock 502 comprises two metallic targets, metallic targets 506(1, 2). In some examples, because the inductive sensors 516 of the AMD 504 would detect a nearest metallic target, the AMD 504 may perform the docking process described below using the dock 102, which includes three metallic targets 108(1)—(3).

At a first time, time 518(1), the AMD 504 is at location 512(1). At the first time, a first inductive sensor 516(1) is at a first distance 508(1) from the first metallic target 506(1). At the first time, the second inductive sensor 516(2) is at a second distance 510(1) from the second metallic target 506(2). In this example, at the first time, the first distance 508(1) is equal, or nearly equal, to the second distance 510(1). At the first time, the docking module 132 uses the first inductive sensor 516(1) to determine a first signal strength based on the first distance 508(1) between the first inductive sensor 516(1) and the first metallic target 506(1). At the first time, the docking module 132 uses the second inductive sensor 516(2) to determine a second signal strength based on the second distance 510(1) between the second inductive sensor 516(2) and the second metallic target 506(2).

In this example, because the first distance 508(1) and the second distance 510(1) are equal, or nearly equal, the first signal strength is equal to, or nearly equal to, the second signal strength. The docking module 132 may use a proportional controller to determine the AMD 504 chassis rotation speed as a function of the strength of inductive sensor measurements. Using a proportional controller, the docking module 132 may use a magnitude of the difference between the first inductive sensor 516(1) and the second inductive sensor 516(2) to determine a proportional magnitude and direction of chassis rotation.

In this example, because the difference between the first signal strength and the second signal strength is zero, or near zero, the AMD 504 is not turned or rotated. Instead, the AMD 504 moves straight, or nearly straight, backward into the dock 502. For example, the motor 124 may equally drive a left wheel and a right wheel, where due to floor conditions, damage, wheel misalignment, or other conditions, the AMD 504 may not move straight backward. In such a case, any drift may be corrected as the inductive sensors continue to provide signal strength values used to steer the AMD 504 in alignment with the dock 502. The AMD 504 moves from location 512(1) at the first time to location 512(2) at time 518(2). As the AMD 504 moves backward onto the dock 502, a caster on the AMD 504, located in the rear, bottom center of the AMD 504 chassis, may make contact with and roll over a first feature 514 on the dock 502. The first feature 514 may be a ramp that elevates the AMD 504 as the AMD 504 moves backward onto the dock 502.

At time 518(2), the AMD 504 is at location 512(2). In this example, at time 518(2), the first inductive sensor 516(1) is directly over the first metallic target 506(1) and the second inductive sensor 516(2) is directly over the second metallic target 506(2). At time 518(2), because the first inductive sensor 516(1) is over the first metallic target 506(1), signal strength may be at a peak level. At time 518(2), because the second inductive sensor 516(2) is over the second metallic target 506(2), signal strength measurements may be at the peak level. A first threshold may be indicative of the peak level.

In this example, at time 518(2), the docking module 132 uses the first inductive sensor 516(1) to determine a third signal strength based on a third distance 508(2) between the first inductive sensor 516(1) and the first metallic target 506(1). At time 518(2), the docking module 132 uses the second inductive sensor 516(2) to determine a fourth signal strength based on a fourth distance 510(2) between the second inductive sensor 516(2) and the second metallic target 506(2). In this example, the third signal strength is greater than the first threshold and the fourth signal strength is greater than the first threshold.

At time 518(2), the docking module 132, based on the third signal strength being greater than the first threshold and the fourth signal strength being greater than the first threshold, may begin to determine whether signal strength measurements from the inductive sensors 516 drop below a second threshold. Until the signal strength measurements drop below the second threshold, the AMD 504 continues to move backward. The second threshold may be associated with an amount of loss of signal strength indicative of the AMD 504 moving a particular distance past location 512(2). The particular distance may be associated with the AMD 504 being docked in the dock 502. For example, the particular distance may be the distance between the AMD 504 in location 512(2) and the AMD 504 in location 512(3).

At time 518(3), the AMD 504 is at location 512(3). At time 518(3), the first inductive sensor 516(1) is at a fifth distance 508(3) from the first metallic target 506(1). At time 518(3), the second inductive sensor 516(2) is at a sixth distance 510(3) from the second metallic target 506(2). At time 518(3), the docking module 132 uses the first inductive sensor 516(1) to determine a fifth signal strength based on the fifth distance 508(3) between the first inductive sensor 516(1) and the first metallic target 506(1). At time 518(3), the docking module 132 uses the second inductive sensor 516(2) to determine a sixth signal strength based on the sixth distance 510(3) between the second inductive sensor 516(2) and the second metallic target 506(2).

In this example, at time 518(3), the fifth signal strength is below the second threshold and the sixth signal strength is below the second threshold. The docking module 132, based on the fifth signal strength being below the second threshold and the sixth signal strength being below the second threshold, determines to stop the AMD 504 at location 512(3). At location 512(3), the AMD 504 is docked.

While in this example, for the purpose of simplicity, the AMD 504 moves directly backward, in other examples, the AMD 504 may turn in a first direction or in a second direction, such as left or right, as the AMD 504 moves backward. For example, the trajectory of the AMD 504 may describe an arc. The AMD 504 may determine to turn in the first direction or the second direction as it moves backward similarly to the AMD 104 determining to turn in the first direction or the second direction as it moves backward as described above with respect to FIG. 1.

Figure 6:
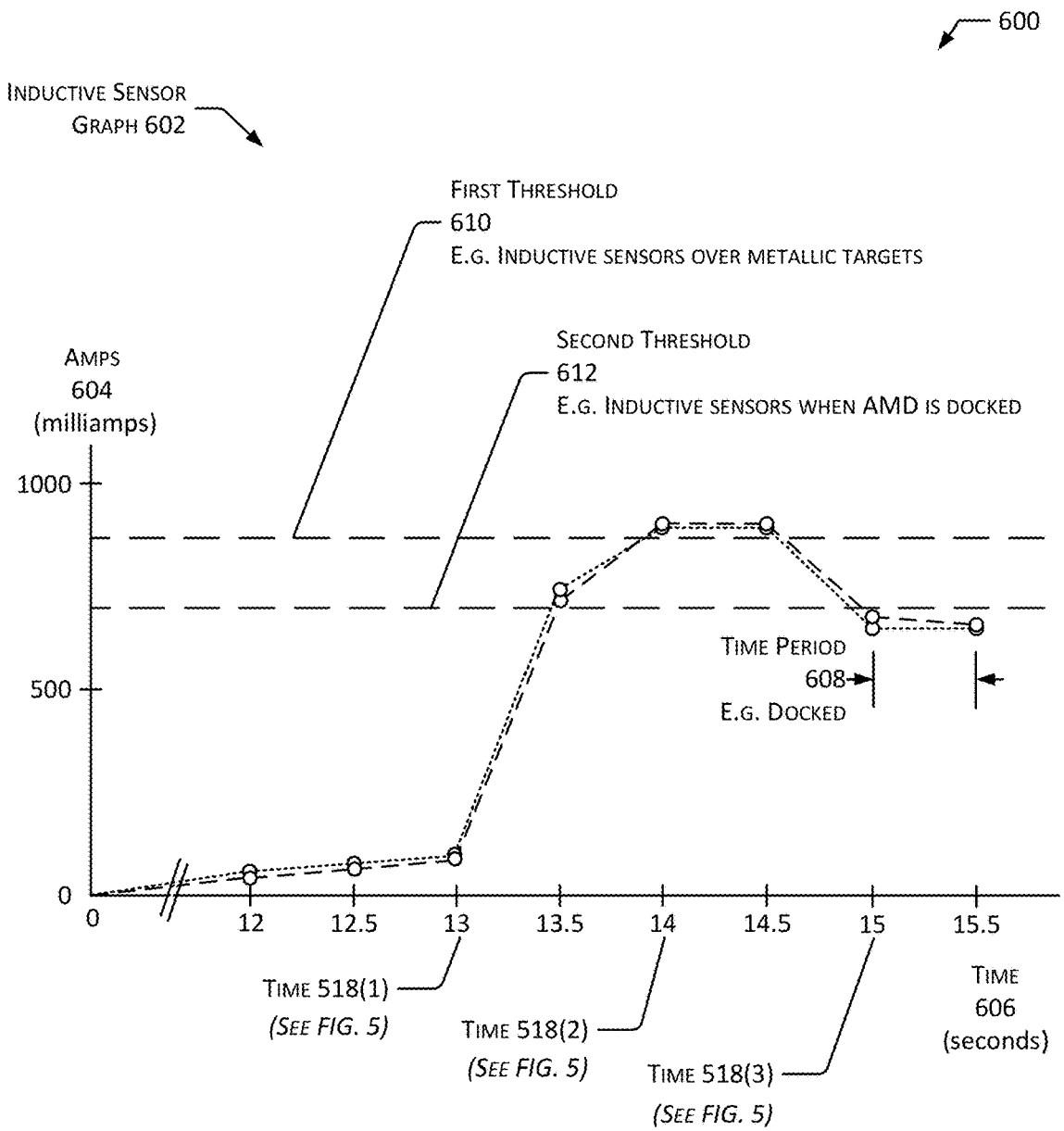
FIG. 6 illustrates a chart of changes in inductive sensor signal strength used to determine motor control data, according to some implementations.

FIG. 6 illustrates a chart of changes in inductive sensor signal strength used to determine motor control data, according to one implementation.

As shown at 600, an inductive sensor graph 602 depicts signal strength values in terms of amps 604, measured in milliamps. In this example, the graph 602 depicts signal strength values measured as the AMD 504 docks. The signal strength values are depicted over a 15.5 second time period. In other examples, depending on an AMD velocity, the time period over which the AMD 504 may dock may be shorter or longer. A legend 614 associates an individual style of line with an individual inductive sensor 516.

The inductive sensor strength measurements in graph 602 are associated with the signal strength measurements described with respect to FIG. 5. The three times 518(1)—(3) are described above with respect to FIG. 5. Time 518(1) is associated with a first time, where at the first time, a front portion of the AMD 504 is turned away from the dock 502. In this example, the AMD 504 determines when to stop moving backward based on determining that signal strength has peaked and then determining an amount of loss of signal strength as the inductive sensors 516 move over and past the metallic targets 506 on a dock 502.

At time 518(1), a front portion of the AMD 504 is turned away from the dock 502. At the first time, the AMD 504 is beginning to move backward, and the first signal strength measured by the first inductive sensor 516(1) and the second signal strength measured by the second inductive sensor 516(2) are weak.

At time 518(2), the first inductive sensor 516(1) is over the first metallic target 506(1) and the second inductive sensor 516(2) is over the second metallic target 506(2). At time 518(2), because the first inductive sensor 516(1) is over the first metallic target 506(1), signal strength may be at a peak level. At 518(2), because the second inductive sensor 516(2) is over the second metallic target 506(2), signal strength measurements may be at the peak level. The first threshold 610 is associated with a signal strength measured when the inductive sensors are over the metallic targets.

At time 518(2), the first inductive sensor 516(1) may determine a third signal strength based on the third distance 508(2) between the first inductive sensor 516(1) and the first metallic target 506(1). At time 518(2), the docking module 132 uses the second inductive sensor 516(2) to determine a fourth signal strength based on the fourth distance 510(2) between the second inductive sensor 516(2) and the second metallic target 506(2). In this example, at time 518(2), the third signal strength is greater than the first threshold 610 and the fourth signal strength is greater than the first threshold 610.

At time 518(2), as the AMD 504 continues to move backward, the inductive sensors 516 will move past the metallic targets 506 and signal strength measurements will begin to weaken. The docking module 132, based on the third signal strength being greater than the first threshold 610 and the fourth signal strength being greater than the first threshold 610, may begin to determine whether signal strength measurements have dropped below the second threshold 612. If the signal strength measurements drop below the second threshold 612, then the docking module 132 may determine that the AMD 504 is docked.

At time 518(3), the first inductive sensor 516(1) is at a fifth distance 508(3) from the first metallic target 506(1) and the second inductive sensor 516(2) is at a sixth distance 510(3) from the second metallic target 506(2). At time 518(3), the docking module 132 uses the first inductive sensor 516(1) to determine a fifth signal strength based on the fifth distance 508(3) between the first inductive sensor 516(1) and the first metallic target 506(1). At time 518(3), the docking module 132 uses the second inductive sensor 516(2) to determine a sixth signal strength based on the sixth distance 510(3) between the second inductive sensor 516(2) and the second metallic target 506(2).

In this example, at time 518(3), the fifth signal strength is below the second threshold 612 and the sixth signal strength is below the second threshold 612. The docking module 132, based on the fifth signal strength being below the second threshold 612 and the sixth signal strength being below the second threshold 612, determines to stop moving the AMD 504 at location 512(3). At location 512(3), the AMD 504 is docked.

Figure 7:
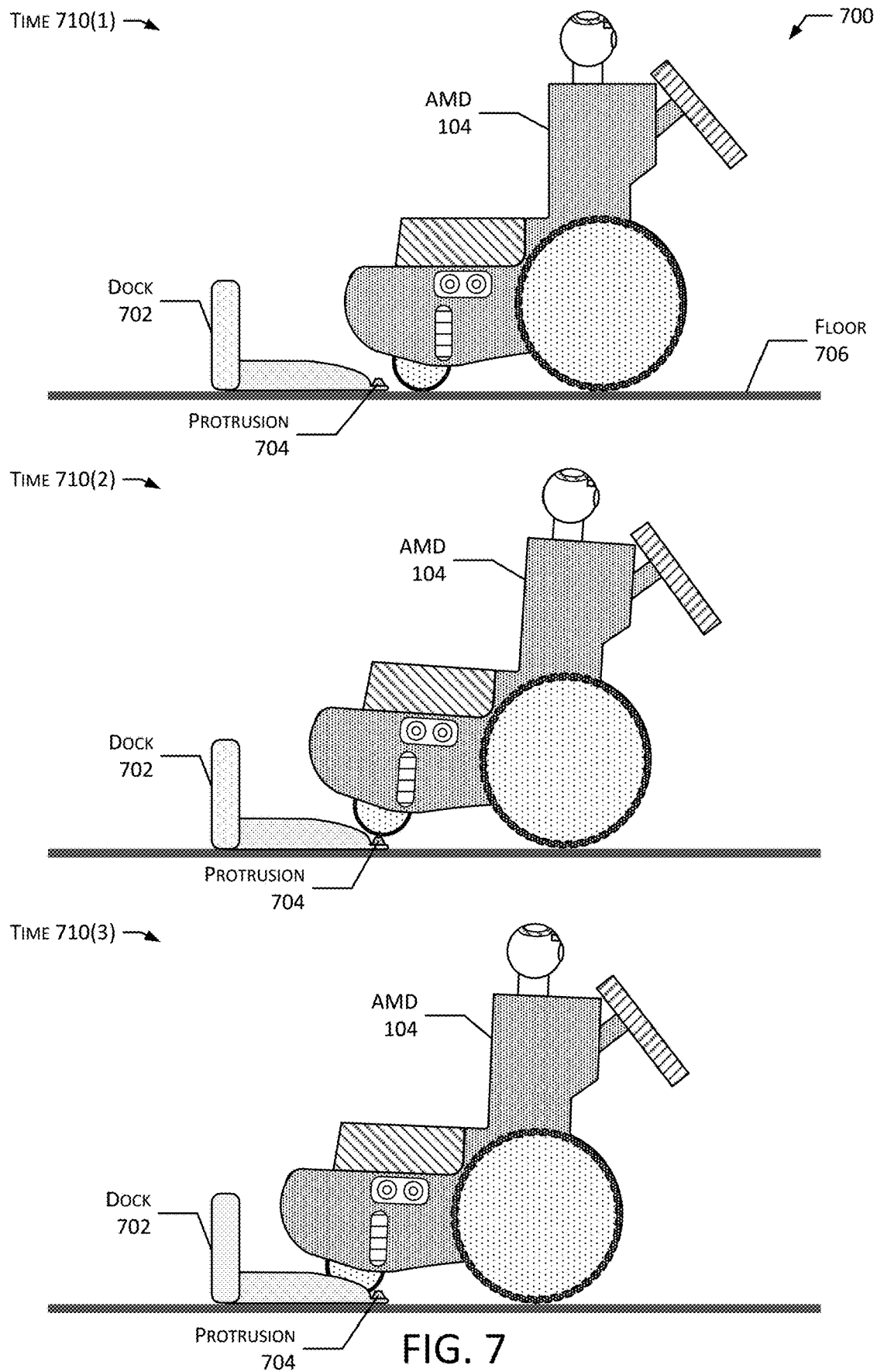
FIG. 7 illustrates a system for docking an AMD using inductive sensors and an inertial measurement unit, according to some implementations.

FIG. 7 illustrates a system 700 for docking an AMD using inductive sensors and an inertial measurement unit, according to some implementations.

In this example, the AMD 104 may use two inductive sensors to align with the dock 702 and use an inertial measurement unit (IMU) to determine when to stop backing up. The AMD 104 uses the IMU to determine a change in acceleration that occurs when the AMD 104 is moving backward and makes contact with a protrusion 704 on the dock 702. The protrusion 704 may extend upward from a portion of the dock that is between a first metallic portion, such as metallic target 108(1), and a second metallic portion, such as metallic target 108(2). The portion of the dock from which the protrusion extends upward may be a ramp. If the change in acceleration is greater than a threshold, then the docking module 132 determines that the AMD 104 has hit or made contact with the protrusion 704. In some examples, the location of the AMD 104 after moving past the protrusion 704 may be associated with the AMD 104 being docked. After the AMD 104 is docked, the AMD 104 stops movement towards the dock. In other examples, after the AMD 104 moves past the protrusion 704, the AMD 104 moves a particular distance relative to the protrusion 702 to become docked. After the AMD 104 is docked, the AMD 104 stops movement towards the dock.

The AMD 104 may use two inductive sensors to navigate similarly to the example in FIG. 1 where the AMD 104 uses three inductive sensors. In this implementation, the AMD 104 uses the first and second metallic targets on the dock 702 to navigate toward the dock 702 similarly to the above example where the AMD 104 comprises three inductive sensors.

In this implementation, the dock 702 may comprise the first and second metallic targets located similarly to the first and second metallic targets in the above example with a dock 102 comprising three metallic targets. The dock 702 may comprise a first feature similar to feature 514, described above with respect to FIG. 5. In this example, the dock 702 comprises a protrusion 704, where the first feature of the dock 702 comprises the protrusion 704. The protrusion 704 may be a bump or ridge formed as part of the first feature, or the protrusion 704 may be affixed to the first feature. The AMD 104 and the dock 702 may be on a floor 706.

At a first time, time 710(1), the docking module 132 has used inductive sensors to navigate the AMD 104 into a location where a rear caster is near the protrusion 704. In this example, the AMD 104 has used the inductive sensors to align the charging pins on the dock 702 with charging contacts on the AMD 104. Because the AMD 104 is aligned with the dock 702, the charging contacts on the AMD 104 will be in contact with the charging pins on the dock 702 if the AMD 104 moves straight backward. In this example, after being aligned, the AMD 104 moves straight backward.

At time 710(2), the AMD 104 moves backward over the protrusion 704. In this example, prior to making contact with the protrusion 704, the AMD 104 may be moving at a steady velocity, so the acceleration of the AMD 104 may be at or near zero. An example velocity may be 0.025 meters per second (m/s). At time 710(2), as a result of the AMD 104 making contact with the protrusion 704, the AMD 104 is slightly jolted upward, and the jolt upward causes a change in velocity and a change in acceleration. The change in acceleration may be measured by the IMU, and the measured acceleration may be a first acceleration. The IMU may determine a plurality of measurements per time period, where a single acceleration value at a given time may be based on the plurality of measurements. For example, the IMU may make N measurements per second, where each acceleration value depicted in graph 802 may be based on an average of M measurements of the N measurements. In one example, N may be 100 and M may be 10.

At time 710(3), the docking module 132 may determine that the first acceleration is greater than a threshold acceleration. If the first acceleration is greater than the threshold acceleration, then the docking module 132 determines that the AMD 104 has moved past the protrusion 704 and is docked. In other examples, the protrusion 704 may be a reference point, and the docking module 132 may determine, based on the AMD 104 moving past the protrusion 704, to move the AMD 104 a particular distance past the protrusion 704 before the AMD 104 is docked.

Figure 8:
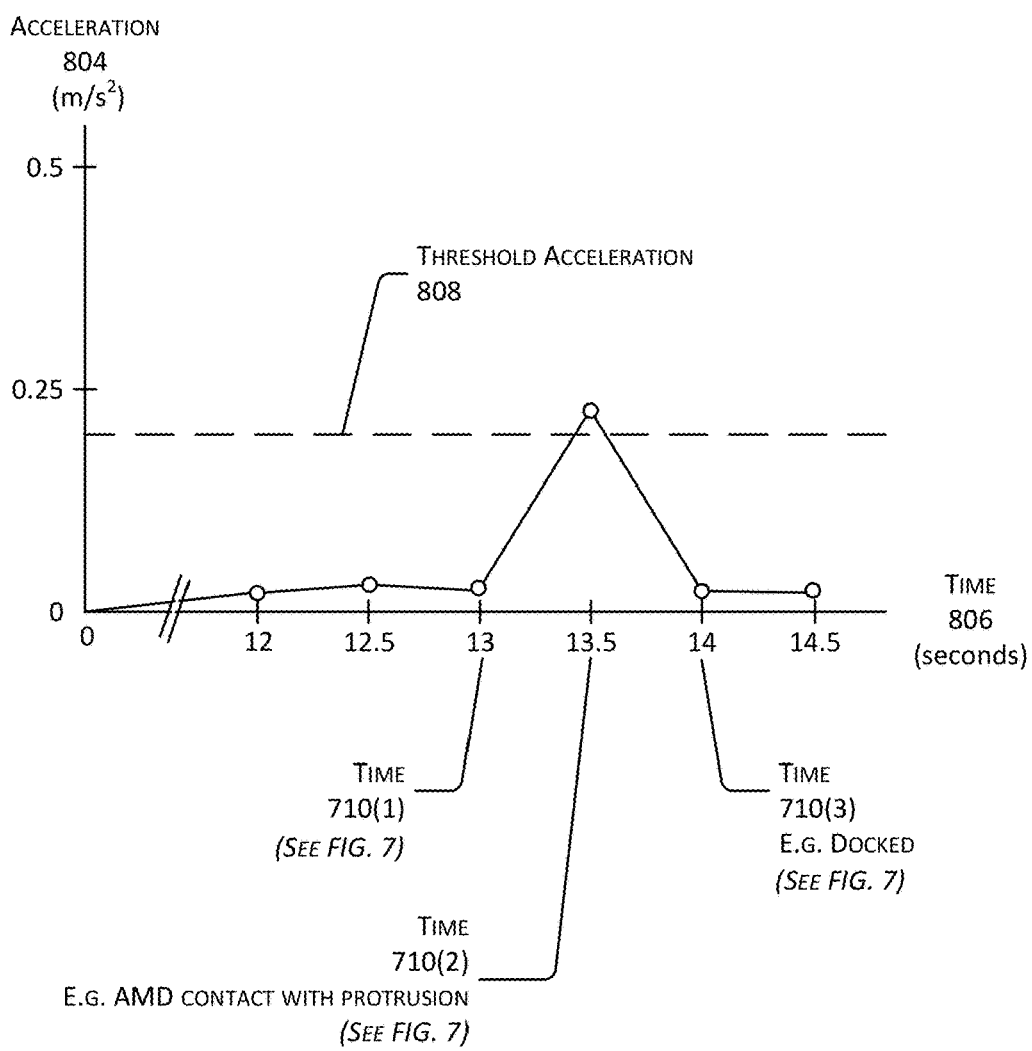
FIG. 8 illustrates a chart of changes in acceleration used to determine motor control data, according to some implementations.

FIG. 8 illustrates a chart of changes in acceleration used to determine motor control data, according to one implementation.

As shown at 800, an inertial measurement unit graph 802 depicts changes in acceleration 804 of the AMD 104, measured in meters per second$^2$. Graph 802 depicts changes in acceleration over time 806 measured in seconds. In this example, graph 802 depicts acceleration of the AMD 104 as the AMD 104 moves backward using two inductive sensors to align with the dock 702 and then uses the IMU to determine when to stop backing up.

The acceleration measurements in graph 802 are associated with IMU measurements with respect to FIG. 7. The three times 710(1)—(3) are described above with respect to FIG. 7. Time 710(1) is associated with a first time, where at the first time, a front portion of the AMD 104 is turned away from the dock 702. In this example, the AMD 104 determines when to stop moving backward based on determining a change in acceleration is greater than a threshold acceleration 808.

At time 710(1), a front portion of the AMD 104 is turned away from the dock 702. At the first time, the AMD 104 is beginning to move backward. At the first time, there may be a spike in acceleration as the AMD 104 begins to move backward. However, because the AMD 104 begins moving backward at a distance away from the dock 702, the docking module 132 may begin tracking IMU measurement after the AMD 104 reaches a constant velocity.

In this example, at time 710(1), the AMD 104 has used the inductive sensors to align the charging pins on the dock 702 with charging contacts on the AMD 104. Because the AMD 104 is aligned with the dock 702, the charging contacts on the AMD 104 will be in contact with the charging pins on the dock 702 if the AMD 104 moves straight backward. In this example, after being aligned, the AMD 104 moves straight backward.

At time 710(2), the AMD 104 moves backward over the protrusion 704. At time 710(2), the docking module 132 may use the IMU to determine a first acceleration of the AMD 104. In this example, the first acceleration is greater than the threshold acceleration 808.

At time 710(3), the docking module 132 may determine that the first acceleration is greater than the threshold acceleration 808. If the first acceleration is greater than the threshold acceleration 808, then the docking module 132 determines that the AMD 104 has moved past the protrusion 704 and is docked. In other examples, the protrusion 704 may be a reference point, and the docking module 132 may determine, based on the AMD 104 moving past the protrusion 704, to move the AMD 104 a particular distance past the protrusion 704 before the AMD 104 is docked.

Figure 9:
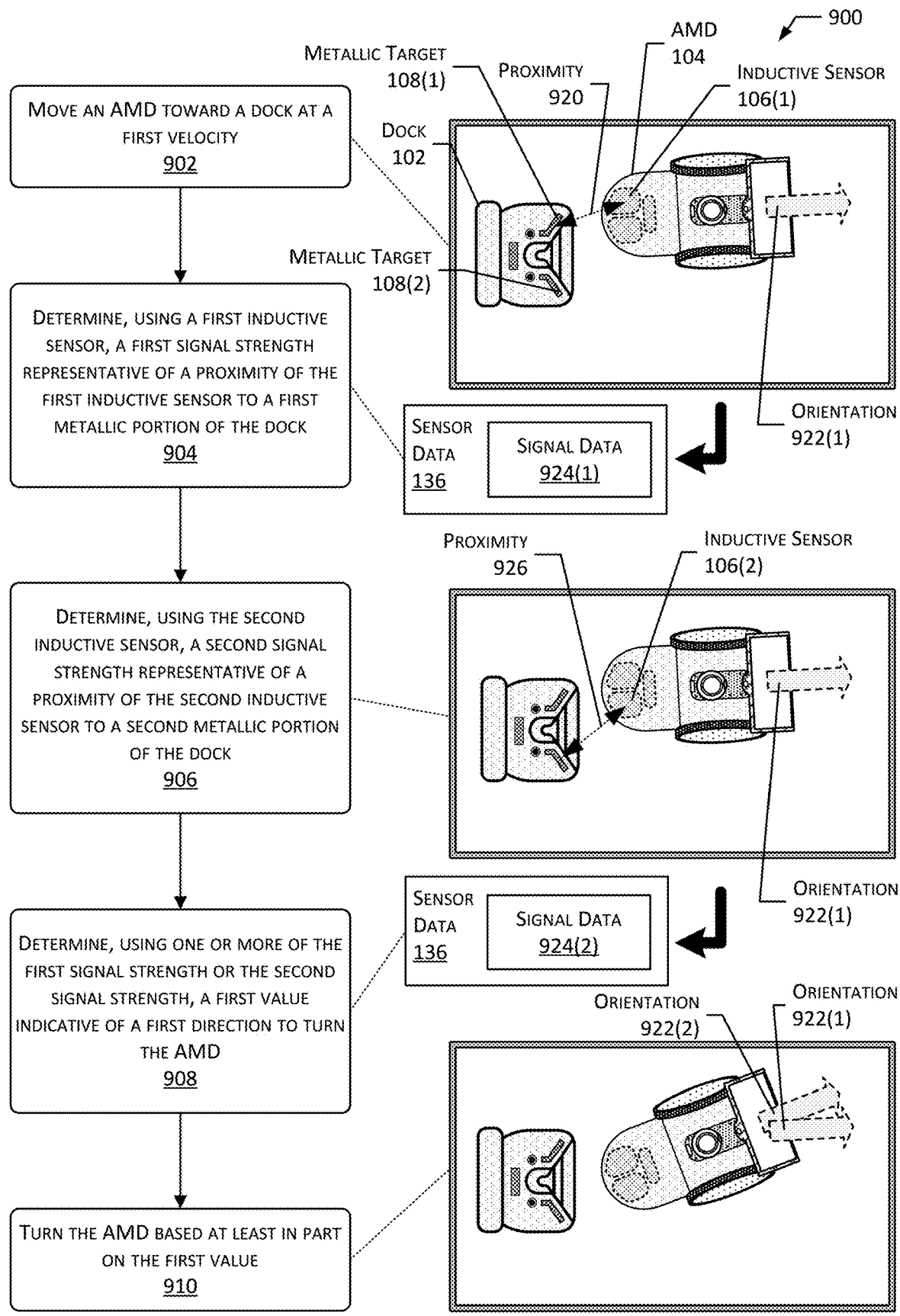
FIG. 9 is a flow diagram of a process for docking an AMD using inductive sensors, according to some implementations.

FIG. 9 is a flow diagram 900 of a process for docking an AMD using inductive sensors, according to some implementations.

In this example, the AMD 104 may use two inductive sensors, 106(1, 2) to navigate backward into a dock 102. The two inductive sensors 106(1, 2) measure signal strengths associated with metallic targets 108(1, 2) on the dock 102. The measured signal strengths are used to align charging pads on the AMD 104 with charging pins on the dock 102. In this example, a single turn is determined. In other examples, after each turn or during a turn, the AMD 104 would continue to move backward, and additional turns would be determined until the AMD 104 is docked. An example of a complete docking process is described above with respect to FIG. 1.

This example begins after the AMD 104 has determined to recharge internal batteries 122 at the dock 102. After determining to recharge, the AMD 104 may use various sensors 130 and navigation maps 348 to navigate moving forward to a location that is near the dock 102. The location may be far enough from the dock 102 to allow the AMD 104 to turn around. After turning around, the AMD 104 may back into the dock 102. This example begins after the AMD 104 has turned around and is turned toward a direction indicated by an orientation 922(1).

At 902, the docking module 132 may move the AMD 104 toward a dock 102 at a first velocity. For example, after the AMD 104 has turned around, the AMD 104 may move straight backward before measurements from the inductive sensors 106 are used. In this example, one or more motors 124 or other actuators may drive the wheels of the AMD 104 to move the AMD 104 backward at the first velocity. The first velocity may be 0.025 m/s. In other examples, a first velocity may be based on a combination of one or more of: frequency of inductive sensor readings, a turning radius of the AMD 104, or an average distance from the AMD 104 to the dock 102 when the AMD 104 begins to move backward to dock.

At 904, the docking module 132 may determine, using a first inductive sensor 106(1), a first signal strength representative of a proximity 920 of the first inductive sensor 106(1) to a first metallic portion of the dock 102. For example, the smaller the proximity between the first inductive sensor 106(1) and the first metallic target 108(1) becomes, the stronger a signal strength becomes. The first inductive sensor 106(1) may measure signal strengths at various frequencies. The first inductive sensor 106(1) may measure a change in electrical current when a magnetic field generated by the inductive sensor changes, where changes to the magnetic field increase as the inductive sensor 106(1) gets closer to a metallic object. The first metallic portion may be the first metallic target 108(1). The first signal strength may be stored as signal data 924(1) within sensor data 136.

At 906, the docking module 132 may determine, using a second inductive sensor 106(2), a second signal strength representative of a proximity 926 of the second inductive sensor 106(2) to a second metallic portion of the dock 102. For example, the second signal strength may be measured by the second inductive sensor 106(2) similarly to the first inductive sensor 106(1) measuring the first signal strength. The second metallic portion may be the second metallic target 108(2). The second signal strength may be stored as signal data 924(2) within sensor data 136.

At 908, the docking module 132 may determine, using one or more of the first signal strength or the second signal strength, a first value indicative of a first direction to turn the AMD 104. For example, using a proportional controller, the docking module 132 may use a magnitude of the difference between the first signal strength and the second signal strength to determine a proportional magnitude and direction of chassis rotation. A first difference may be a result of subtracting the second signal strength from the first signal strength. The first value may be the first difference.

At 910, the docking module 132 may turn the AMD 104 based at least in part on the first value. For example, if the first signal strength measured by the first inductive sensor 106(1) is greater than the second signal strength measured by the second inductive sensor 106(2), then the AMD 104 is turned to the right by a magnitude in proportion to the first value. For example, an amount to turn, or a magnitude of a turn, may be indicated by a number of degrees to turn. The magnitude of the turn may be indicated by a magnitude value. If the first signal strength is greater than the second signal strength, then the first value is a positive number, and the AMD 104 turns to the right at a magnitude in proportion to the first value. The first value may be indicative of a direction value. If the first signal strength is less than the second signal strength, then the first difference is a negative number, and the AMD 104 turns to the left at a magnitude in proportion to the first value. If the first signal strength is equal to the second signal strength, then the first value is zero, and the AMD 104 does not turn and moves straight backward.

After 910, the docking process may continue by repeating steps 902-910 until a stopping point is determined. As described above with respect to FIG. 1, in one example, a stopping point may be determined by using a third inductive sensor 106(3) determining a threshold signal strength value with respect to a third metallic target 108(3). As described above with respect to FIG. 5, in another example, a stopping point may be based on determining that signal strength has peaked and then determining an amount of loss of signal strength as the inductive sensors move over and past the metallic targets on a dock. As described above with respect to FIG. 7, in another example, a stopping point may be determined using two inductive sensors to align with the dock and use an IMU to determine when to stop backing up. In another example, a stopping point may be determined based on the AMD 104 determining an electrical voltage provided by the dock. Based on determining the electrical voltage provided by the dock, the AMD 104 stops movement towards the dock, and may begin charging. As another example, if after turning at 910, the AMD 104 moves backward, the docking module 132 may determine that one or more batteries 122 of the AMD 104 have begun charging. Based on the one or more batteries 122 of the AMD 104 charging, the docking module 132 may stop the AMD 104 moving toward the dock and the AMD 104 may charge.

Figure 10:
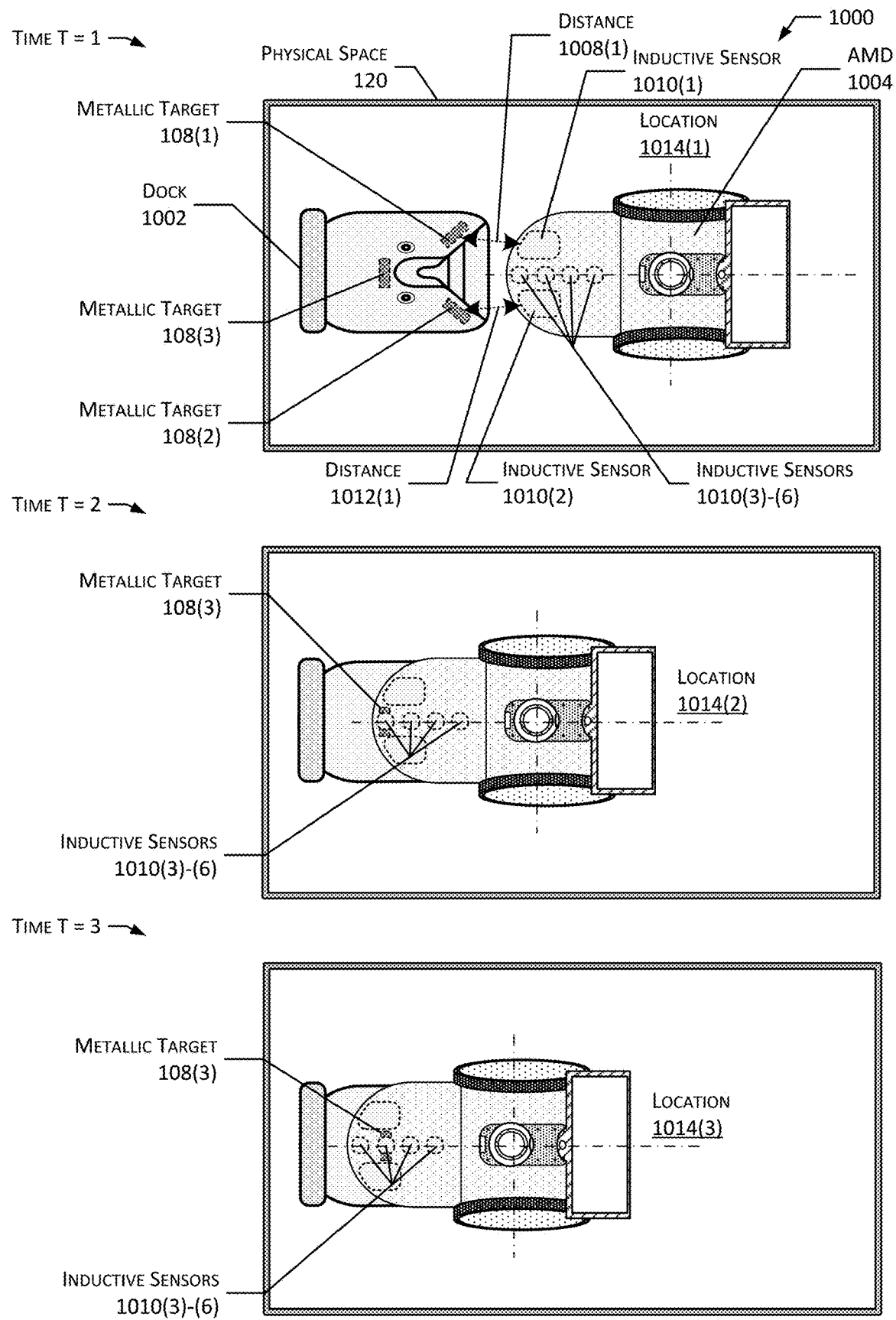
FIG. 10 illustrates a system for docking an AMD using inductive sensors, according to some implementations.

FIG. 10 illustrates a system 1000 for docking an AMD using inductive sensors, according to some implementations.

The AMD 1004 may include a plurality of inductive sensors, inductive sensors 1010(1)—(6). Inductive sensors 1010(1, 2) may be used to align the AMD 1004 with the dock 1002. Inductive sensors 1010(3)—(6) may be used to determine when to stop moving the AMD 1004 backward. Inductive sensors 1010(3)—(6) may be located along a front-to-back centerline of the AMD 1004.

In this example, a third inductive sensor 1010(3) is nearest the aft of the AMD 1004, a fourth inductive sensor 1010 (4) is second nearest the aft of the AMD 1004, a fifth inductive sensor 1010 (5) is third nearest the aft of the AMD 1004, and a sixth inductive sensor 1010 (6) is fourth nearest the aft of the AMD 1004. The AMD 1004 may determine when to stop moving backward based on determining that a signal strength for a particular inductive sensor of the centerline inductive sensors 1010 (3)—(6) has either peaked or reached a threshold value. In this example, the AMD 1004 is docked when the fourth inductive sensor 1010 (4) is over the third metallic target 108(3). In another example, for a dock with a different configuration, the AMD 1004 may be docked when a different centerline inductive sensor 1010(3)—(6) measures a peak value or a threshold value with respect to an associated metallic target 108.

Aside from having additional inductive sensors 1010, the AMD 1004 may be implemented similarly to the AMD 104 described above. The docking process for the AMD 1004 using inductive sensors 1010(1, 2) to align with the dock 1002 is similar to the docking process for the AMD 104 to align with the dock 102 using two inductive sensors 106(1, 2). In this example, the dock 1002 comprises three metallic targets, metallic targets 108(1)—(3).

At a first time, time T=1, the AMD 1004 is at location 1014(1). At the first time, a first inductive sensor 1010(1) is at a first distance 1008(1) from the first metallic target 108(1). At the first time, the second inductive sensor 1010(2) is at a second distance 1012(1) from the second metallic target 108(2). In this example, at the first time, the first distance 1008(1) is equal, or nearly equal, to the second distance 1012(1). At the first time, the docking module 132 uses the first inductive sensor 1010(1) to determine a first signal strength based on the first distance 1008(1) between the first inductive sensor 1010(1) and the first metallic target 108(1). At the first time, the docking module 132 uses the second inductive sensor 1010(2) to determine a second signal strength based on the second distance 1012(1) between the second inductive sensor 1010(2) and the second metallic target 108(2).

The docking module 132 may use a proportional controller to determine the AMD 1004 chassis rotation speed as a function of the strength of inductive sensor measurements. In this example, the difference between the first signal strength and the second signal strength is zero, or near zero, and the AMD 1004 is not turned or rotated. Instead, the AMD 1004 moves straight, or nearly straight, backward into the dock 1002. By moving backward, the AMD 1004 moves from location 1014(1) at the first time to location 1014(2) at a second time, time T=2.

At the second time, the AMD 1004 is at location 1014(2). In this example, at the second time, the third inductive sensor 1010(3) is directly over the third metallic target 108(3). The fourth inductive sensor 1010(4) is not yet over the third metallic target 108(3), and the signal strength measurement at the second time for the fourth inductive sensor 1010(4) has neither peaked nor reached a threshold value. Based on the signal strength measurement from the fourth inductive sensor 1010(4) at the second time not having peaked or reached the threshold value, the AMD 1004 continues to move backward. In this example, signal strengths from the first and second inductive sensors 1010(1, 2) continue to be equal, and consequently, the AMD 1004 continues to move straight backward. By moving backward, the AMD 1004 moves from location 1014(2) at the second time to location 1014(3) at a third time, time T=3.

At the third time, the AMD 1004 is at location 1014(3). In this example, at the third time, the fourth inductive sensor 1010(4) is directly over the third metallic target 108(3). In an implementation using a peak value, if the AMD 1004 continues to move backward, the signal strength may begin to weaken, indicating the signal strength has peaked. In this example, based on the signal strength peaking, the AMD 1004 may stop movement backward. In an implementation using a threshold value, at the third time, the signal strength from the fourth inductive sensor 1014(4) may reach the threshold value. Based on the signal strength at the fourth time reaching the threshold value, the AMD 1004 may stop movement backward.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) comprising:
    a first inductive sensor;
    a second inductive sensor;
    one or more memories storing computer-executable instructions; and
    one or more processors to execute the computer-executable instructions to:
        move the AMD towards a dock at a first velocity;
        determine, using the first inductive sensor, a first signal strength representative of a first proximity of the first inductive sensor to a first passive metallic portion of the dock;
        determine, using the second inductive sensor, a second signal strength representative of a second proximity of the second inductive sensor to a second passive metallic portion of the dock;
determine, using one or more of the first signal strength or the second signal strength, first data indicative of a first direction to turn the AMD;
turn the AMD based at least in part on the first data;
determine, using the first inductive sensor or the second inductive sensor, a third signal strength indicating a third proximity of the AMD to a third passive metallic portion of the dock; and
stop, based on the third signal strength being greater than a first threshold, movement of the AMD.

2. The AMD of claim 1, further comprising a first battery coupled to a charging contact; and
wherein the one or more processors execute the computer-executable instructions further to:
determine presence of electrical voltage at the charging contact; and
wherein stopping the movement of the AMD is further based on the presence of the electrical voltage.

3. The AMD of claim 1, wherein the first inductive sensor is located at a bottom, aft, left portion of the AMD, and wherein the second inductive sensor is located at a bottom, aft, right portion of the AMD.

4. The AMD of claim 1, wherein the one or more processors execute the computer-executable instructions further to:
determine the first direction based on a first difference between the first signal strength and the second signal strength, wherein the first difference is a positive number; and
determine a magnitude value corresponding to the first difference, wherein the magnitude value is indicative of an angular measurement; and
wherein the first data comprises the magnitude value.

5. The AMD of claim 1, wherein the one or more processors execute the computer-executable instructions further to:
determine, using the first inductive sensor, a fourth signal strength representative of a fourth proximity of the first inductive sensor to the first passive metallic portion of the dock;
determine, using the second inductive sensor, a fifth signal strength representative of a fifth proximity of the second inductive sensor to the second passive metallic portion of the dock;
determine that each of the fourth signal strength and the fifth signal strength is greater than a second threshold;
continue to move the AMD towards the dock at the first velocity;
determine, using the first inductive sensor, a sixth signal strength representative of a sixth proximity of the first inductive sensor to the first passive metallic portion of the dock;
determine, using the second inductive sensor, a seventh signal strength representative of a seventh proximity of the second inductive sensor to the second passive metallic portion of the dock; and
determine that each of the sixth signal strength and the seventh signal strength is less than a third threshold; and
wherein the stopping the movement of the AMD is further based on the sixth signal strength and the seventh signal strength being less than the third threshold.

6. The AMD of claim 1 further comprising an inertial measurement unit (IMU); and
wherein the one or more processors execute the computer-executable instructions further to:
determine, using the IMU, a first acceleration of the AMD; and
determine that the first acceleration is greater than a second threshold; and
wherein the stopping the movement of the AMD is further based on the first acceleration being greater than the second threshold.

7. The AMD of claim 1, wherein the AMD comprises a third inductive sensor, and wherein the one or more processors execute the computer-executable instructions further to:
determine, using the third inductive sensor, a fourth signal strength indicating a fourth proximity of the AMD to the third passive metallic portion of the dock; and
wherein stopping the movement of the AMD is further based on the fourth signal strength being greater than a second threshold.

8. A method comprising:
moving an autonomous mobile device (AMD) towards a dock at a first velocity;
determining, using a first inductive sensor of the AMD, a first signal strength representative of a first proximity of the first inductive sensor to a first passive metallic portion of the dock;
determining, using a second inductive sensor of the AMD, a second signal strength representative of a second proximity of the second inductive sensor to a second passive metallic portion of the dock;
determining, using one or more of the first signal strength or the second signal strength, first data indicative of a first direction to turn the AMD; and
turning the AMD based at least in part on the first data.

9. The method of claim 8, further comprising:
determining, using a third inductive sensor of the AMD, a third signal strength indicating a third proximity of the AMD to a third passive metallic portion of the dock; and
stopping, based on the third signal strength being greater than a first threshold, the moving of the AMD towards the dock.

10. The method of claim 8, further comprising:
determining an electrical voltage provided by the dock; and
stopping, based on the electrical voltage, movement of the AMD towards the dock.

11. The method of claim 8, further comprising:
determining the first direction based on a first difference between the first signal strength and the second signal strength, wherein the first difference is a positive number; and
determining a magnitude value corresponding to the first difference, wherein the magnitude value is indicative of an angular measurement; and
wherein the first data comprises the magnitude value.

12. The method of claim 8, further comprising:
determining, using the first inductive sensor, a third signal strength representative of a third proximity of the first inductive sensor to the first passive metallic portion of the dock;
determining, using the second inductive sensor, a fourth signal strength representative of a fourth proximity of the second inductive sensor to the second passive metallic portion of the dock;
determining that the third signal strength and the fourth signal strength are greater than a first threshold;
moving the AMD towards the dock at the first velocity;

determining, using the first inductive sensor, a fifth signal strength representative of a fifth proximity of the first inductive sensor to the first passive metallic portion of the dock;

determining, using the second inductive sensor, a sixth signal strength representative of a sixth proximity of the second inductive sensor to the second passive metallic portion of the dock;

determining that the fifth signal strength and the sixth signal strength are less than a second threshold; and stopping, based on the fifth signal strength and the sixth signal strength being less than the second threshold, movement of the AMD towards the dock.

13. The method of claim 8, further comprising:

determining, using an inertial measurement unit on the AMD, a first acceleration; and stopping, based on the first acceleration being greater than a first threshold, movement of the AMD towards the dock.

14. A system comprising:

an autonomous mobile device (AMD) comprising:
 a first inductive sensor;
 a second inductive sensor;
 one or more memories storing computer-executable instructions; and
 one or more processors to execute the computer-executable instructions to:
  move the AMD towards a dock at a first velocity;
  determine, using the first inductive sensor, a first signal strength representative of a first proximity of the first inductive sensor to a first passive metallic portion of the dock;
  determine, using the second inductive sensor, a second signal strength representative of a second proximity of the second inductive sensor to a second passive metallic portion of the dock;
  determine, using one or more of the first signal strength or the second signal strength, first data indicative of a first direction to turn the AMD; and
  turn the AMD based at least in part on the first data.

15. The system of claim 14, the AMD further comprising a third inductive sensor; and wherein the one or more processors execute the computer-executable instructions further to:

determine, using the third inductive sensor, a third signal strength indicating a third proximity of the AMD to a third passive metallic portion of the dock; and stop, based on the third signal strength being greater than a first threshold, movement of the AMD towards the dock.

16. The system of claim 14, wherein the one or more processors execute the computer-executable instructions further to:

determine an electrical voltage provided by the dock; and stop, based on the electrical voltage, movement of the AMD towards the dock.

17. The system of claim 14, wherein the one or more processors execute the computer-executable instructions further to:

determine the first direction based on a first difference between the first signal strength and the second signal strength, wherein the first difference is a positive number; and determine a magnitude value corresponding to the first difference, wherein the magnitude value is indicative of an angular measurement; and wherein the first data comprises the magnitude value.

18. The system of claim 14, further comprising:

the dock, wherein the dock comprises:
 the first passive metallic portion located along a first portion of the dock; and
 the second passive metallic portion located along a second portion of the dock.

19. The system of claim 14, further comprising:

the dock, wherein the dock comprises:
 the first passive metallic portion located proximate to a first portion of the dock;
 the second passive metallic portion located proximate to a second portion of the dock; and
 a third passive metallic portion located proximate to a third portion of the dock.

20. The system of claim 14, wherein the one or more processors execute the computer-executable instructions further to:

determine, using an inertial measurement unit on the AMD, a first acceleration; and stop, based on the first acceleration being greater than a first threshold, movement of the AMD towards the dock.

* * * * *